(12) United States Patent
Basunov

(10) Patent No.: US 9,769,070 B2
(45) Date of Patent: Sep. 19, 2017

(54) SYSTEM AND METHOD OF PROVIDING A PLATFORM FOR OPTIMIZING TRAFFIC THROUGH A COMPUTER NETWORK WITH DISTRIBUTED ROUTING DOMAINS INTERCONNECTED THROUGH DATA CENTER INTERCONNECT LINKS

(71) Applicant: Maxim Basunov, Tiraspol (MD)

(72) Inventor: Maxim Basunov, Tiraspol (MD)

( * ) Notice: Subject to any disclaimer, the term of this patent is extended or adjusted under 35 U.S.C. 154(b) by 0 days.

(21) Appl. No.: 14/607,545

(22) Filed: Jan. 28, 2015

(65) Prior Publication Data

US 2016/0218971 A1     Jul. 28, 2016

(51) Int. Cl.
*H04L 12/26* (2006.01)
*H04L 12/721* (2013.01)
*H04L 12/715* (2013.01)
*H04L 12/725* (2013.01)

(52) U.S. Cl.
CPC ............. *H04L 45/70* (2013.01); *H04L 45/04* (2013.01); *H04L 45/302* (2013.01); *H04L 43/0894* (2013.01); *H04L 43/10* (2013.01)

(58) Field of Classification Search
CPC ......... H04L 45/70; H04L 47/10; H04L 47/12; H04L 47/122; H04L 47/125; H04L 47/24; H04L 47/2425; H04L 47/2433; H04L 45/44; H04L 43/10
See application file for complete search history.

(56) References Cited

U.S. PATENT DOCUMENTS

| | | |
|---|---|---|
| 2,421,919 A | 6/1947 | Avery |
| 3,155,775 A | 11/1964 | Zarouni |
| 3,231,676 A | 1/1966 | Carlstrom et al. |
| 3,342,945 A | 9/1967 | Hopper et al. |
| 3,525,814 A | 8/1970 | Cox |
| 3,591,724 A | 7/1971 | Yaku et al. |
| 4,475,192 A | 10/1984 | Fernow et al. |
| 4,484,326 A | 11/1984 | Turner |
| 4,556,972 A | 12/1985 | Chan et al. |
| 4,669,113 A | 5/1987 | Ash et al. |
| 4,704,724 A | 11/1987 | Krishnan et al. |
| 4,825,206 A | 4/1989 | Brice, Jr. et al. |
| 4,862,496 A | 8/1989 | Kelly et al. |

(Continued)

OTHER PUBLICATIONS

Y. Rekhter, T. Li, S. Hares, "A Border Gateway Protocol 4 (BGP-4)", The Internet Engineering Task Force (IETF), RFC 4271, Jan. 2006. (http://www.ietf.org/rfc/rfc4271.txt).

(Continued)

*Primary Examiner* — Kevin Mew
(74) *Attorney, Agent, or Firm* — Neal Marcus

(57) ABSTRACT

A system is disclosed for providing a platform for optimizing traffic through a computer network having first and second distributed routing domains interconnected through a data center interconnect link. The system comprises one or more servers storing method steps to be executed by the one or more servers. The method steps comprising determining values for QoS characteristics for all routes of traffic routed from first and second routing domains to a destination network and re-rerouting packets from the first routing domain to the second routing domain through the data center interconnect link with better QoS characteristics values than the QoS characteristics values for the first routing domain.

26 Claims, 9 Drawing Sheets

(56) References Cited

U.S. PATENT DOCUMENTS

| | | |
|---|---|---|
| 4,905,233 A | 2/1990 | Cain et al. |
| 4,979,118 A | 12/1990 | Kheradpir |
| 4,991,204 A | 2/1991 | Yamamoto et al. |
| 5,042,027 A | 8/1991 | Takase et al. |
| 5,063,523 A | 11/1991 | Vrenjak |
| 5,088,032 A | 2/1992 | Bosack |
| 5,117,422 A | 5/1992 | Hauptschein et al. |
| 5,142,570 A | 8/1992 | Chaudhary et al. |
| 5,150,360 A | 9/1992 | Perlman |
| 5,179,027 A | 1/1993 | Fisher |
| 5,203,012 A | 4/1993 | Patsiokas et al. |
| 5,233,604 A | 8/1993 | Ahmadi et al. |
| 5,239,653 A | 8/1993 | Cubero-Castan et al. |
| 5,253,248 A | 10/1993 | Dravida et al. |
| 5,317,562 A | 5/1994 | Nardin et al. |
| 5,377,327 A | 12/1994 | Jain et al. |
| 5,467,345 A | 11/1995 | Cutler, Jr. et al. |
| 5,495,426 A | 2/1996 | Waclawsky et al. |
| 5,517,620 A | 5/1996 | Hashimoto et al. |
| 5,521,910 A | 5/1996 | Matthews |
| 5,557,747 A | 9/1996 | Rogers et al. |
| 5,615,254 A | 3/1997 | Qiu et al. |
| 5,668,951 A | 9/1997 | Jain et al. |
| 5,724,513 A | 3/1998 | Ben-Nun et al. |
| 5,742,587 A | 4/1998 | Zornig et al. |
| 5,781,534 A | 7/1998 | Perlman et al. |
| 5,781,634 A | 7/1998 | Cordery et al. |
| 5,838,663 A | 11/1998 | Elwalid et al. |
| 5,870,561 A | 2/1999 | Jarvis et al. |
| 5,870,581 A | 2/1999 | Redford |
| 5,881,051 A | 3/1999 | Arrowood et al. |
| 5,884,047 A | 3/1999 | Aikawa et al. |
| 5,898,668 A | 4/1999 | Shaffer |
| 5,933,425 A | 8/1999 | Iwata |
| 5,953,312 A | 9/1999 | Crawley et al. |
| 5,995,503 A | 11/1999 | Crawley et al. |
| 6,016,307 A | 1/2000 | Kaplan et al. |
| 6,044,075 A | 3/2000 | Le Boudec et al. |
| 6,047,326 A | 4/2000 | Kilkki |
| 6,047,331 A | 4/2000 | Medard et al. |
| 6,055,571 A | 4/2000 | Fulp et al. |
| 6,061,723 A | 5/2000 | Walker et al. |
| 6,064,677 A | 5/2000 | Kappler et al. |
| 6,084,858 A | 7/2000 | Matthews et al. |
| 6,097,699 A | 8/2000 | Chen et al. |
| 6,104,700 A | 8/2000 | Haddock et al. |
| 6,130,890 A | 10/2000 | Leinwand et al. |
| 6,154,778 A | 11/2000 | Koistinen et al. |
| 6,181,679 B1 | 1/2001 | Ashton et al. |
| 6,185,635 B1 | 2/2001 | O'Loughlin et al. |
| 6,226,751 B1 | 5/2001 | Arrow et al. |
| 6,236,642 B1 | 5/2001 | Shaffer et al. |
| 6,249,801 B1 | 6/2001 | Zisapel et al. |
| 6,252,848 B1 | 6/2001 | Skirmont |
| 6,256,314 B1 | 7/2001 | Rodrig et al. |
| 6,260,072 B1 | 7/2001 | Rodriguez-Moral |
| 6,262,976 B1 | 7/2001 | McNamara |
| 6,275,470 B1 | 8/2001 | Ricciulli |
| 6,292,464 B1 | 9/2001 | Elahmadi et al. |
| 6,301,244 B1 | 10/2001 | Huang et al. |
| 6,363,053 B1 | 3/2002 | Schuster et al. |
| 6,370,584 B1 | 4/2002 | Bestavros et al. |
| 6,374,300 B2 | 4/2002 | Masters |
| 6,393,486 B1 | 5/2002 | Pelavin et al. |
| 6,400,681 B1 | 6/2002 | Bertin et al. |
| 6,404,769 B1 | 6/2002 | Kapoor |
| 6,405,219 B2 | 6/2002 | Saether et al. |
| 6,456,594 B1 | 9/2002 | Kaplan et al. |
| 6,463,470 B1 | 10/2002 | Mohaban et al. |
| 6,466,984 B1 | 10/2002 | Naveh et al. |
| 6,473,802 B2 | 10/2002 | Masters |
| 6,493,317 B1 | 12/2002 | Ma |
| 6,516,192 B1 | 2/2003 | Spaur et al. |
| 6,522,881 B1 | 2/2003 | Feder et al. |
| 6,570,867 B1 | 5/2003 | Robinson et al. |
| 6,574,495 B1 | 6/2003 | Golman et al. |
| 6,578,076 B1 | 6/2003 | Putzolu |
| 6,594,268 B1 | 7/2003 | Aukia et al. |
| 6,606,303 B1 | 8/2003 | Hassel et al. |
| 6,658,457 B2 | 12/2003 | Nishikawa et al. |
| 6,665,702 B1 | 12/2003 | Zisapel et al. |
| 6,678,248 B1 | 1/2004 | Haddock et al. |
| 6,690,649 B1 | 2/2004 | Shimada |
| 6,697,333 B1 | 2/2004 | Bawa et al. |
| 6,718,359 B2 | 4/2004 | Zisapel et al. |
| 6,724,722 B1 | 4/2004 | Wang et al. |
| 6,728,265 B1 | 4/2004 | Yavatkar et al. |
| 6,745,243 B2 | 6/2004 | Squire et al. |
| 6,775,280 B1 | 8/2004 | Ma et al. |
| 6,785,237 B1 | 8/2004 | Sufleta |
| 6,801,502 B1 | 10/2004 | Rexford et al. |
| 6,816,464 B1 | 11/2004 | Scott et al. |
| 6,842,783 B1 | 1/2005 | Boivie et al. |
| 6,847,613 B2 | 1/2005 | Mimura et al. |
| 6,857,025 B1 | 2/2005 | Maruyama et al. |
| 6,914,886 B2 | 7/2005 | Peles et al. |
| 6,928,051 B2 | 8/2005 | Butt et al. |
| 6,947,379 B1 | 9/2005 | Gleichauf et al. |
| 6,954,431 B2 | 10/2005 | Roberts |
| 6,965,948 B1 | 11/2005 | Eneborg et al. |
| 6,981,055 B1 | 12/2005 | Ahuja et al. |
| 6,993,584 B2 | 1/2006 | Border et al. |
| 7,035,938 B2 | 4/2006 | Lau |
| 7,042,848 B2 | 5/2006 | Santiago et al. |
| 7,046,636 B1 | 5/2006 | Shaffer et al. |
| 7,051,367 B1 | 5/2006 | Krishnaswamy et al. |
| 7,065,044 B2 | 6/2006 | Wang et al. |
| 7,080,161 B2 | 7/2006 | Leddy et al. |
| 7,120,114 B1 | 10/2006 | Miyamoto |
| 7,133,365 B2 | 11/2006 | Klinker et al. |
| 7,139,242 B2 | 11/2006 | Bays |
| 7,222,190 B2 | 5/2007 | Klinker et al. |
| 7,230,919 B2 | 6/2007 | Flanagan et al. |
| 7,240,124 B2 | 7/2007 | Schwartz et al. |
| 7,245,609 B2 * | 7/2007 | D'Eletto ........... H04L 29/06027 370/352 |
| 7,260,645 B2 | 8/2007 | Bays |
| 7,269,157 B2 | 9/2007 | Klinker et al. |
| 7,272,115 B2 | 9/2007 | Maher, III et al. |
| 7,286,479 B2 | 10/2007 | Bragg |
| 7,336,613 B2 | 2/2008 | Lloyd et al. |
| 7,343,413 B2 | 3/2008 | Gilde et al. |
| 7,349,994 B2 | 3/2008 | Balonado et al. |
| 7,362,707 B2 | 4/2008 | McLampy et al. |
| 7,363,367 B2 | 4/2008 | Lloyd et al. |
| 7,363,371 B2 | 4/2008 | Kirkby et al. |
| 7,406,539 B2 | 7/2008 | Baldonado et al. |
| 7,457,233 B1 | 11/2008 | Gan et al. |
| 7,492,720 B2 | 2/2009 | Pruthi et al. |
| 7,561,517 B2 | 7/2009 | Klinker et al. |
| 7,606,160 B2 | 10/2009 | Klinker et al. |
| 7,668,966 B2 | 2/2010 | Klinker et al. |
| 8,203,954 B1 | 6/2012 | Patel et al. |
| 8,223,951 B1 * | 7/2012 | Edelhaus ............. G06Q 10/107 379/115.01 |
| 8,266,327 B2 * | 9/2012 | Kumar ..................... H04L 63/08 709/223 |
| 8,429,630 B2 * | 4/2013 | Nickolov .............. G06F 9/4856 717/110 |
| 8,743,696 B2 * | 6/2014 | Chowdhury ............ H04L 45/04 370/237 |
| 8,891,513 B1 * | 11/2014 | Huang .................... H04L 45/64 370/352 |
| 8,897,183 B2 * | 11/2014 | Andreasen .......... H04L 12/4633 370/254 |
| 8,977,284 B2 * | 3/2015 | Reed .................. H04W 64/006 455/404.2 |
| 9,049,197 B2 * | 6/2015 | Lum .................. H04L 65/1006 |
| 9,087,319 B2 * | 7/2015 | Nguyen ................. G06Q 10/10 |
| 9,183,560 B2 * | 11/2015 | Abelow ............... G06Q 10/067 |
| 9,253,663 B2 * | 2/2016 | Raleigh ................. H04W 24/02 |
| 2001/0021176 A1 | 9/2001 | Mimura et al. |
| 2001/0023442 A1 | 9/2001 | Masters |

(56) References Cited

U.S. PATENT DOCUMENTS

| | | | |
|---|---|---|---|
| 2001/0037387 | A1 | 11/2001 | Gilde et al. |
| 2001/0042073 | A1 | 11/2001 | Saether et al. |
| 2002/0010765 | A1 | 1/2002 | Border |
| 2002/0010792 | A1 | 1/2002 | Border et al. |
| 2002/0039352 | A1 | 4/2002 | El-Fekih et al. |
| 2002/0040400 | A1 | 4/2002 | Masters |
| 2002/0057651 | A1 | 5/2002 | Roberts |
| 2002/0057699 | A1 | 5/2002 | Roberts |
| 2002/0075813 | A1 | 6/2002 | Baldonado et al. |
| 2002/0078223 | A1 | 6/2002 | Baldonado et al. |
| 2002/0103846 | A1 | 8/2002 | Zisapel et al. |
| 2002/0105909 | A1 | 8/2002 | Flanagan et al. |
| 2002/0105911 | A1 | 8/2002 | Pruthi et al. |
| 2002/0110084 | A1 | 8/2002 | Butt et al. |
| 2002/0129161 | A1 | 9/2002 | Lloyd et al. |
| 2002/0141378 | A1 | 10/2002 | Bays et al. |
| 2002/0145981 | A1 | 10/2002 | Klinker et al. |
| 2002/0163884 | A1 | 11/2002 | Peles et al. |
| 2002/0176427 | A1 | 11/2002 | Noda et al. |
| 2002/0184393 | A1 | 12/2002 | Leddy et al. |
| 2002/0186661 | A1 | 12/2002 | Santiago et al. |
| 2002/0199016 | A1 | 12/2002 | Freedman |
| 2003/0002443 | A1 | 1/2003 | Basso et al. |
| 2003/0012145 | A1 | 1/2003 | Bragg |
| 2003/0016627 | A1 | 1/2003 | McLampy et al. |
| 2003/0039212 | A1 | 2/2003 | Lloyd et al. |
| 2003/0074449 | A1 | 4/2003 | Smith et al. |
| 2003/0076840 | A1 | 4/2003 | Rajagopal et al. |
| 2003/0079005 | A1 | 4/2003 | Myers et al. |
| 2003/0086422 | A1 | 5/2003 | Klinker et al. |
| 2003/0088529 | A1 | 5/2003 | Klinker et al. |
| 2003/0088671 | A1 | 5/2003 | Klinker et al. |
| 2003/0118029 | A1 | 6/2003 | Maher, III et al. |
| 2003/0187934 | A1 | 10/2003 | Nishikawa et al. |
| 2004/0196787 | A1 | 10/2004 | Wang et al. |
| 2007/0041326 | A1 | 2/2007 | Babiarz et al. |
| 2013/0322255 | A1* | 12/2013 | Dillon ............... H04L 47/22 370/236 |
| 2014/0101228 | A1* | 4/2014 | Dalela ............ G06Q 10/06315 709/203 |
| 2015/0029864 | A1 | 1/2015 | Raileanu et al. |
| 2016/0080502 | A1* | 3/2016 | Yadav ............... H04L 41/12 709/227 |

OTHER PUBLICATIONS

B. Claise, Ed., "Specification of the IP Flow Information Export (IPFIX) Protocol for the Exchange of IP Traffic Flow Information," The Internet Engineering Task Force (IETF), RFC 5101, Jan. 2008. (http://www.ietf.org/rfc/rfc5101.txt).
B. Claise, Ed., "Cisco Systems NetFlow Services Export Version 9", The Internet Engineering Task Force (IETF), RFC 3954, Oct. 2004. (http://www.ietf.org/rfc/rfc3954.txt).
V. Fuller, T. Li, "Classless Inter-domain Routing (CIDR): The Internet Address Assignment and Aggregation Plan", The Internet Engineering Task Force (IETF), RFC 4632, Aug. 2006. (http://www.ietf.org/rfc/rfc4632.txt).
J. Moy, "OSPF Version 2", The Internet Engineering Task Force (IETF), RFC 2328, Apr. 1998. (http://www.ietf.org/rfc/rfc2328.txt).
D. Savage, D. Slice, J. Ng, S. Moore, R. White, "Enhanced Interior Gateway Routing Protocol, draft-savage-eigrp-00.txt", The Internet Engineering Task Force (IETF), Feb. 18, 2013. (https://tools.ietf.org/html/draft-savage-eigrp-00).
P. Phaal, S. Panchen, N. McKee, "InMon Corporation's sFlow: A Method for Monitoring Traffic in Switched and Routed Networks", The Internet Engineering Task Force (IETF), RFC 3176, Sep. 2001. (https://www.ietf.org/rfc/rfc3176.txt).
P. Phaal, "sFlow Version 5", Jul. 2004. (http://www.sflow.org/sflow_version_5.txt).
U.S. Appl. No. 14/535,615, filed Nov. 7, 2014, "System and Method for Optimizing Traffic in Packet-Switched Networks With Internet Exchanges" (Grigore Raileanu et al.).

Jeff Caruso. "Net Management Wises Up". Network World, Dec. 14, 1998. p. 8.
Bob Wallace. "Cisco and Concord Promise Carrier Info". Computerworld, Dec. 21, 1998. p. 16.
Steven Low. "Optimization Flow Control With On-Line Measurement or Multiple Paths". University of Melbourne, Feb. 25, 1999.
"HP OpenView NetMatrix/UX Distributed Network Analysis Version 6.02". DNA User's Guide, Jun. 1999.
"Cisco IOS 12.0 Quality of Service". "Policy-Based Routing". Cisco Press, Apr. 23, 1999. p. 6-7.
D. Awduche, J. Malcolm, J. Agogbua, M. O'Dell, J. McManus. "Requirements for Traffic Engineering Over MPLS". Request for Comments 2702, Network Working Group, Sep. 1999.
G. Apostolopoulos, D. Williams, S. Kamat, R. Guerin, A. Orda, T. Przygienda. "QoS Routing Mechanisms and OSPF Extensions". Request for Comments 2676, Network Working Group, Aug. 1999.
Wei Sun. "QoS/Policy/Constraint Based Routing". Ohio State University, Dec. 1, 1999.
"Transport Network Event Correlation". International Telecommnuication Union, Feb. 2000.
"Tivoli NetView Performance Monitor for TCP/IP Helps Optimize IP Network Performance". IBM, Sep. 5, 2000.
Peter Morrissey. "IP Routing Primer: Part Five". Network Computing, Dec. 4, 2000.
P. Phaal, S. S Panchen, N. McKee. "Request for Comments 3176; InMon Corporation's sFlow: A Method for Monitoring Traffic in Switched and Routed Networks". Network Working Group, Sep. 2001.
David Anderson, Hari Balakrishnan, Frans Kaashoek, Robert Morris. "Resilient Overlay Networks". AC, Oct. 2001.
"Tivoli NetView 7.1 Offers Enhanced Network Management Capabilities at Lower Cost". IBM, Oct. 16, 2001.
"Capital Rut Has Little Weight for Internet Route Controllers". The Wall Street Journal (www.wsj.com/artciles/SB101097122166056660), Jan. 14, 2002.
Hedrick, Charles L. "An Introduction to IGRP". Document ID 26825, Rutgers University, The State University of New Jersey, Center for Computers and Information Services, Laboratory for Computer Science Research, Aug. 22, 1991.
Jacobson, Van, and Karels, Michael J. "Congestion Avoidance and Control." Nov. 1988.
"Proficient Networks NPE1010A Network Policy Engine". Proficient Networks, Inc. Copyright 2001.
Cisco. "Cisco-IGRP Metric". Cisco Systems, Inc., 1992-2002.
Aukia, Petri, and Oy, Nixu. "Quality of Service Based Routing". (http://web.archive.org/web/20051124171849/http://www.tml.tkk.fi/Opinnot/Tik-110.551/1996/qos_rout.html). Nov. 24, 2005.
Cisco. "BGP Link Bandwidth". pp. 1-16, Cisco Systems, Inc., Jan. 6, 2011.
Baumann, Rainer, Heimlicher, Simon, Strasser, Mario, and Weibel, Andreas. "A Survey on Routing Metrics". TIK Report 262, Computer Engineering and Networks Laboratory, ETH-Zentrum, Switzerland, Feb. 10, 2007.
Rekhter, Y., and Li, T. A Border Gateway Protocol 4 (BGP-4). Request for Comments: 1771, T.J. Watson Research Center, IBM Corp., Mar. 1995.
"HP fortifies management tools". WANs & Internetworking, Network World, Dec. 2, 1996, p. 17.
Seshan, Srinivasan, et al. "Handoffs in Cellular Wireless Networks: The Daedalus Implementation and Experience". Wireless Personal Communications, Jan. 1997.
"Route Control: Building Real Confidence in the Internet". TeleChoice, Feb. 28, 2002.
Leinwand, Allan. "Network Policy Engine NPE1010A Appliance". Network World, The Signature Series, Apr. 29, 2002.
Fitzsimmons, Heather. "Proficient Networks Unveils Comprehensive Bandwidth Management Capabilities for the Enterprise Data Center." Business Wire, Jun. 23, 2003.
Cisco. "Response Time Reporter Enhancements". Cisco IOS Release 12.0(3)T. Mar. 18, 2006. (http://web.archive.org/web/*/http://www.optimumdata.com/shop/files/cisco/2600/2600_Response_Time_Reporter_Enhancements.pdf).

(56) References Cited

OTHER PUBLICATIONS

Gomez, Shaun. "CCIE Studies: Performance Routing PfR/OER". Technology Evangelist, Jul. 22, 2013.
Sharma, Ranjana. "Telemanagement Packages Centralize Net Control". Network World, May 16, 1988, p. 73.
Scott, Karyl. "NetWare Routing Router-Basic". Infoworld, Jul. 13, 1992, p. 47.
Duffy, Jim. "Frontier Software Pioneers RMON for the WAN with NETscout Analyzer". Network World, Aug. 16, 1993, p. 17.
"Netview Performance Monitor Version 2 Release 1". Announcement letter No. 293-625, IBM. dated Oct. 28, 1993.
Dryden, Patrick. "The LAN, WAN Monitoring Frontier". Computerworld, Jul. 15, 1996, p. 63.
Fitzloff, Emily. "HP NetMetrix 5.0 Gets Improved RMON2 Capabilities". Infoworld, Sep. 22, 1997, p. 51.
Duffy, Jim. "HP Plans Big Event for OpenView 6.0". Network World, Dec. 15, 1997, p. 5.
Wallace, Bob. "Cisco and Concord Promise Carrier Info". Computerworld, Dec. 21, 1998, p. 16.
Opnix. Copyright 2000. (www.opinix.com/whatwedo/whatwedo.shtml).
Howe, Peter J. "Sockeye Wins $28 Million in VC Funds for its Routing System Gets Data Past Net Traffic Jams". Page C3, Business Section, The Boston Globe, Jun. 25, 2001.
"Company Overview". Sockeye Networks. (http://web.archive.org/web/20010702084014/http://www.sockeye.com/pages/overview.htm), Jul. 2, 2001.
Fitzloff, Emily. "Seagate NerveCenter to Provide Mixed NT/Unix Event Correlation". Infoworld, Feb. 9, 1998, p. 45.
Duffy, Jim. "HP to Pop Two Products for Network Service Management". Network World, Jun. 1, 1998, p. 13.
Francis, Peter. "Re: Routescience?" North American Network Operators Group, Aug. 22, 2001.
Routescience. "Introducing Routescience Pathcontrol". RouteScience Technologies, Inc., Copyright 2001.
Non-Final Office Action dated Nov. 17, 2016 for U.S. Appl. No. 14/535,615, filed Nov. 7, 2014. (Raileanu et al.).
Non-Final Office Action dated Apr. 22, 2016 for U.S. Appl. No. 14/335,234, filed Jul. 18, 2014 (Raileanu et al.).
Non-Final Office Action dated Sep. 8, 2016 for U.S. Appl. No. 14/335,234, filed Jul. 18, 2014 (Raileanu et al.).
Zhang, Lixia. "VirtualClock: A New Traffic Control Algorithm for Packet Switching Networks." ACM 1990.
"What We Do—Simply High-Performance Bandwidth." Jan. 24, 2001. Opnix. (http://web.archive.org/web/20010124043200/http://www.opnix.com/whatwedo/performance.shtml).
Non-Final Office Action dated Nov. 17, 2016 for U.S. Appl. No. 14/535,615, filed Nov. 7, 2014 (Raileanu et al.).
Non-Final Office Action dated Jan. 9, 2017 for U.S. Appl. No. 14/535,615, filed Nov. 7, 2014 (Raileanu et al.).
Leonard Kleinrock, "Message Delay in Communication Nets with Storage". Massachusetts Institute of Technology, Dec. 1962.
John M. McQuillan, Ira Richer, Eric C. Rosen. "The New Routing Algorithm for the ARPANET". IEEE Transactions on Communications, May 1980. p. 711-19.
D.L. Mills. "Request for Comments 904; Exterior Gateway Protocol Formal Specification". Network Working Group, Apr. 1984.
"Products and Services". Network World, Sep. 8, 1986, p. 26-27.
Paul Korzeniowski. "Early users give thumbs up to Peregrine system". Network World, Sep. 28, 1987. p. 23-25.
Ranjana Sharma. "Telemanagement packages centralize net control". Network World, May 16, 1988, p. 73.
J. Case, M. Fedor, M. Schoffstall, J. Davin. "Requests for Comments 1067; A Simple Network Management Protocol". Network Working Group, Aug. 1988.
"Principles for a Telecommunications Management Network" International Telecommunication Union, Nov. 1988.
J. Rekhter. "Request for Comments 1092; EGP and Policy Based Routing in the New NSFNET Backbone", Feb. 1989.

K. Lougheed, Y. Rekhter. "A Border Gateway Protocol". Request for Comments 1105, Network Working Group, Jun. 1989.
M. Little. "Goals and Functional Requirements for Inter-Autonomous System Routing". Request for Comments 1126, Network Working Group. Oct. 1989.
J. Moy. "The OSPF Specification". Request for Comments 1131, Network Working Group, Oct. 1989.
Dr. Jason Liu. "Advanced Facilities to Expedite Design and Evaluation of Communications Systems". SBIRSource, Dec. 31, 1989.
David Oran. "OSI IS-IS Intra-domain Routing Protocol". Request for Comments 1142, Network Working Group, Feb. 1990.
Paul Li. "Who's accepting deposits in the repository?" Network World, Apr. 16, 1990. p. 37.
K. McCloghrie, M. Rose. "Request for Comments 1213; Management Information Base for Network Management of TCP/IP-Based Internets: MIB-II". Network Working Group, Mar. 1990.
Charles L. Hedrick Rutgers. "An Introduction to IGRP". Cisco, Aug. 22, 1991.
Roch A. Guerin, Hamid Ahmadi, Mahmoud Naghshineh. "Equivalent Capacity and Its Application to Bandwidth Allocation in High-Speed Networks". University of Pennsylvania Scholarly Commons, Sep. 1, 1991. p. 968-81.
K. Lougheed, Y. Rekhter. "A Border Gateway Protocol 3 (BGP-3)", Request for Comments 1267, Network Working Group. Oct. 1991.
Y. Rekhter, P. Gross. "Application of the Border Gateway Protocol in the Internet", Request for Comments 1268, Network Working Group, Oct. 1991.
P. Almquist. "Type of Service in the Internet Protocol Suite". Request for Comments 1349, Network Working Group, Jul. 1992.
Karyl Scott. "NetWare Multiprotocol Router-Basic". InfoWorld, Jul. 13, 1992. p. 47.
Cengiz Alaettinoglu, A. Udaya Shankar, Klaudia Dussa-Zieger, Ibrahim Matta. "Design and Implementation of MaRS: A Routing Testbed". University of Maryland, Sep. 1992.
Jim Duffy. "Frontier Software Pioneers RMON for the WAN with NETscout Analyzer". Network World, Aug. 16, 1993. p. 17.
"Announcement Letter No. 293-625". IBM, Oct. 28, 1993. p. 1-12.
R Fabregat-Gasa, J.L. Marzo-Lazaro, J. Sole-Pareta, J. Domino-Pascual. "Adaptive Routing Based on Real-Time Calculations Using the Convolution Approach". EFOC & N, 1994.
Frisch et al., Network Management and Control, vol. 2, Plenum Press, 1994. p. 471.
J. Moy. "OSPF Version 2". Request for Comments 1583, Network Working Group, Mar. 1994.
Abhay K. Parekh, Robert G. Gallagher. "A Generalized Processor Sharing Approach to Flow Control in Integrated Services Networks: The Multiple Node Case". IEEE/ACM Transactions on Networking, Apr. 1994.
Skip MacAskill. "Chipcom casts its dice in switch mgmt. game". Network World, Jun. 15, 1994. p. 87.
Y. Rekhter. "A Border Gateway Protocol 4 (BGP-4)". Request for Comments 1654, Network Working Group, Jul. 1994.
S. Waldbusser. "Remote Network Monitoring Management Information Base". Request for Comments 1757, Network Working Group, Feb. 1995.
Y. Rekhter, P. Gross. "Application of the Border Gateway Protocol in the Internet". Request for Comments 1772, Network Working Group, Mar. 1995.
"BISDN Inter Carrier Interface (B-ICI) Specification Version 2.0 (Integrated)". The ATM Forum Technical Committee, Dec. 1995.
"Private Network-Network Interface Specification Version 1.0 (PNNI 1.0)". The ATM Forum Technical Committee, Mar. 1996.
J. Hawkinson, T. Bates. "Guidelines for Creation, Selection and Registration of an Autonomous System (AS)". Request for Comments 1930, Network Working Group, Mar. 1996.
Patrick Dryden. "The LAN, WAN Monitoring Frontier". Computerworld, Jul. 15, 1996.
John McConnell. "Behavior mgmt tames client/server environments". Network World, Apr. 22, 1996. p. 44.
E. Chen, T. Bates. "An Application of the BGP Community Attribute in Multi-Home Routing". Request for Comments 1998, Network Working Group, Aug. 1996.

(56) References Cited

OTHER PUBLICATIONS

Zheng Wang, Jon Crowcroft. "Quality-of-Service Routing for Supporting Multimedia Applications". IEEE Journal on Selected Areas in Communications, Sep. 1996. p. 1228-34.
R. Minnear, R. Hinden. "IGRPng for IPv6", Internet Draft, IGRPng, Nov. 1996.
"Frontier Software Development Becomes NetScout Systems, taking on name of leading product family". Business Wire, Mar. 31, 1997.
S. Shenker, J. Wroclawski. "General Characterization Parameters for Integrated Service Network Elements". Request for Comments 2215, Network Working Group, Sep. 1997.
Emily Fitzloff. "HP NetMetrix 5.0 gets improved RMON2 capabilities". p. 51, Infoworld, Sep. 2, 1997.
Kevin Thompson, Gregory J. Miller, Rick Wilder. "Wide-Area Traffic Patterns and Characteristics" (Extended Version). IEEE Network, Nov./Dec. 1997.
Jim Duffy. "HP Plans Big Event for Open View 6.0". p. 5. Network World, Dec. 15, 1997.
"Tivoli NetView Performance Monitor Expands Monitoring Support to TCP/IP". IBM, Jun. 23, 1998.
E. Crawley, R. Nair, B. Rajagoapala. "A Framework for QoS-Based Routing in the Internet". Request for Comments 2386, Network Working Group, Aug. 1998.
Andy Collins. "The Detour Framework for Packet Rerouting", University of Washington, Oct. 29, 1998.
Savage, Stefan et al. "End-to-End Effects of Internet Path Selection." Department of Compute Science and Engineering, University of Washington, 1990.
"What is Best Path Global Transit." Opnix. Copyright 2000.
"Routing Intelligence System, Taming Internet Performance." Orbit 1000 routing intelligence system, Opnix, Inc. Copyright 2001.
John J. Hunter. "Topological optimization, Two new software tools help network planners optimize designs." p. 47, Network World. Sep. 14, 1987.
"Network Monitoring Using Cisco Service Assurance Agent." Feb. 24, 2014. (Archive.org—http://www.cisco.com/c/en/us/td/docs/ios/12_2/configfu/index.html).
G. Apostolopoulos, R. Gu'erin, S. Kamat, and S. Tripathi. "Improving QoS routing performance under inaccurate link state information," in Proceedings of ITC'16, Jun. 1999.
Jim Duffy. "HP fortifies management tools." p. 17, Network World. Dec. 2, 1996.
"Carbon Copy Release 3.0" and "Multi-Log X.25." p. 26, Network World. Sep. 8, 1986.
Ranjana Sharma. "Telemanagement packages centralize net control." p. 73, Network World. May 16, 1988.
"Network Performance Monitor Version 2 Release 1." IBM. Oct. 28, 1993.
Bob Wallace. "Cisco and Concord promise carrier info." Computerworld. Dec. 1, 1998.
Opnix. Jan. 24, 2001. (Archive.org).
"Introducing Routescience Pathcontrol." RouteScience Technologies, Inc. Copyright 2001.
Skip Macaskill. Chipcom casts its dice in switch mgmt. game. Network World. Jun. 15, 1994.
Patrick Dryden. "The LAN, WAN monitoring frontier." p. 63, Computerworld. Jul. 15, 1996.
"Load Balancing with CEF." Cisco Systems. Dec. 14, 2002. (http://www.cisco.com/en/US/products/hw/modules/ps2033/prod_technical_reference09186a00800afeb7.html).
Non-Final Office Action dated Jan. 1, 2017 for U.S. Appl. No. 14/535,615, filed Nov. 7, 2014.
Final Office Action dated Apr. 18, 2017 for U.S. Appl. No. 14/335,234, filed Jul. 18, 2014. (Raileanu et al.).

\* cited by examiner

SYSTEM AND METHOD OF PROVIDING A PLATFORM FOR OPTIMIZING TRAFFIC THROUGH A COMPUTER NETWORK WITH DISTRIBUTED ROUTING DOMAINS INTERCONNECTED THROUGH DATA CENTER INTERCONNECT LINKS

FIELD OF THE INVENTION

The present invention relates to a system and method of providing a platform for optimizing traffic through a computer network with distributed routing domains interconnected through data center interconnect links.

BACKGROUND OF THE INVENTION

Multi-homed networks are connected to other distant destination networks, via the Internet for example and through several networking service providers (SPs) such as Internet service providers as well as other packet-switched networks. Multi-homed networks are advantageous if one of the connections to an SP fails. As soon as a router interconnected to that SP determines that the connection is lost, it re-routes all traffic through other SPs. However, in order to decrease operational costs and improve network utilization, reliability and performance, multi-homed networks require bandwidth, performance and cost management and control. Bandwidth, performance and cost management and control typically involve measuring, evaluating and re-routing parts of the traffic from existing current routes to alternative available routes with improved quality of service (QoS). The problem becomes more difficult for networks distributed across multiple routing domains wherein each routing domain receives its own data and enforces its own routing policy. A single routing domain covers one or more point of presence with the same routing data and policy. Sometimes more than one routing domain can be distinguished in a single POP if sub-networks use differentiated routing data and apply different policies.

Some (controlled) networks distributed across multiple routing domains interconnect with each other via a data center interconnect (DCI). DCI are links with guaranteed quality of service for data transfer across routing domains. While it is possible to optimize each of the routing domains individually, the optimization process can only be performed locally. That is, optimization can be achieved only through a provider interface, as known to those skilled in the art, inside a routing domain in a multi-homed network. Outages, congestion and other degradation of QoS in one routing domain are addressed by network operators who manually change policies in routing domain with degraded QoS to re-route packets addressed to congested destination networks through DCI links towards a different routing domain with improved QoS. This is done only in cases when the problem becomes too big to ignore it due to limited human operator capacities and resources. Managing routes manually (i.e., set route priority and blocking policies which re-route some network prefixes to other provider interfaces) is too complex and time consuming for human operators when it must be performed on an ongoing or periodic basis and as such, many small problems that cause QoS degradation remain un-addressed. Consequently, traffic on computers networks is not routed as efficiently.

It would thus be advantageous to provide a system and method that will overcome the problems with the systems described above.

SUMMARY OF THE INVENTION

In accordance with an embodiment of the present disclosure, a system and method are disclosed for providing a platform for optimizing traffic through a computer network with two or more distributed routing domains that are interconnected through a data center interconnect link. The platform measures QoS characteristics values for all routes of traffic to a destination network. When a service provider for an originating routing domain has significantly better QoS than service providers for the other routing domains on the network or when service providers for some routing domains have significantly degraded QoS for some destinations, traffic from the originating routing domains with poor QoS can be re-routed to the another routing domain with the better QoS through the data center interconnect link, and subsequently take the better route from that originating routing domain to reach the destination network (with overall improved QoS). The platform allows the computer network to offer better overall services and to re-route away from congested regions or outage segments of the route towards destination networks.

In accordance with an embodiment of the present disclosure, a computer implemented method of providing a platform for optimizing traffic on a computer network including a plurality of routing domains that route the traffic to one or more destination networks, the plurality of routing domains interconnected via one or more data center interconnect links, the method comprising: defining a plurality of service providers that are able to route traffic to a destination network via the plurality of service providers; identifying each service provider of the plurality of service providers that is capable of routing the traffic from the plurality of routing domains to the destination network; determining values for QoS characteristics of the one or more data center interconnect links; determining values for QoS characteristics of routes originating from each service provider of the plurality of service providers that is capable of routing the traffic from the plurality of routing domains to the destination network; and determining whether the traffic for the destination network will be re-routed from a first service provider to a second service provider of the plurality of service providers based on the values of the QoS characteristics for (1) each of the routes originating from service providers of the plurality of service providers and (2) the one or more data center interconnect links.

In accordance with an embodiment of the present disclosure, a method is disclosed of providing a platform for optimizing traffic on a computer network including a plurality of routing domains that route the traffic to one or more destination networks through a plurality of service providers, the method implemented in one or more servers configured to execute the method, the method comprising: identifying a plurality of service providers that are capable of routing the traffic from a first routing domain and a second routing domain to the destination network, wherein the first and second routing domains are interconnected to through a data center interconnect link; probing the destination network between (1) the first and second routing domains and (2) the destination network to determine the values for QoS of routes originating from the plurality of service providers; and determining whether to route the traffic through a first service provider of the plurality of service providers instead of through a second service provider of the plurality of service providers based on the values for QoS of the routes originating from first and second service providers, respectively.

In accordance with an embodiment of the present disclosure, a system is disclosed for providing a platform for optimizing traffic on a computer network including a plurality of routing domains that route the traffic to one or more destination networks through a plurality of service providers, the system including one or more servers storing computer executable instructions that when executed by the one or more servers, cause the one or more servers to: identify a plurality of service providers that are capable of routing the traffic from a first routing domain and a second routing domain to the destination network, wherein the first and second routing domains are interconnected to through a data center interconnect link; probe the destination network between (1) the first and second routing domains and (2) the destination network to determine values for QoS of routes originating from the plurality of service providers; and determine whether to route the traffic through a first service provider of the plurality of service providers instead of through a second service provider of the plurality of service providers based on the values for the QoS of the routes originating from first and second service providers, respectively.

In accordance with an embodiment of this disclosure, a system is disclosed for providing a platform for optimizing traffic on a controlled network including a plurality of routing domains that route the traffic to one or more destination networks through a plurality of service providers, the plurality of routing domains interconnected by one or more data center interconnect links, the system including one or more servers storing computer program modules to be executed by the one or more servers, the modules comprising: (a) a first module for identifying the flows of traffic that are routed from the plurality of routing domains to a destination network through the plurality of service providers; and (b) a second module for probing the plurality of service providers to determine values for QoS characteristics of all routes of the traffic to the destination network; and wherein the first module is further for determining a best route of all routes for the traffic based on the values for QoS characteristics.

In accordance with an embodiment of this disclosure, a system is disclosed for providing a platform for optimizing traffic on a computer network including a plurality of routing domains that route the traffic to one or more destination networks through a plurality of service providers, the system including one or more servers storing computer programs steps to be executed by the one or more servers, the steps comprising: (a) configuring service providers capable of routing traffic to a destination network, wherein configuring includes identifying one or more service providers that are capable of routing traffic to the destination network from a second routing domain; (b) configuring topology of a data center interconnect link interconnecting the first and second routing domains; (c) periodically determining values for QoS characteristics of the data center interconnect link; (d) determining relevant flows of traffic routed towards the destination network to determine one or more service providers that route traffic from the first routing domain to the destination network and one or more service providers that route traffic from the second routing domain; (e) determining values for QoS characteristics of routes originating from one or more service providers that route traffic from first and second routing domains to the destination network; (f) identifying a service provider that currently routes traffic from the first routing domain and a service provider currently routes or is capable or routing traffic from the second routing domain to the destination network; and (g) determining if the traffic currently routed from the first routing domain should be re-routed through the second routing domain based on the values for QoS.

DETAILED DESCRIPTION OF THE INVENTION

In the following detailed description, reference will be made to the accompanying drawing(s), in which identical functional elements are designated with numerals. The aforementioned accompanying drawings show by way of illustration and not by way of limitation, specific embodiments of this disclosure. The following detailed description is, therefore, not to be construed in a limited sense.

Figure 1:
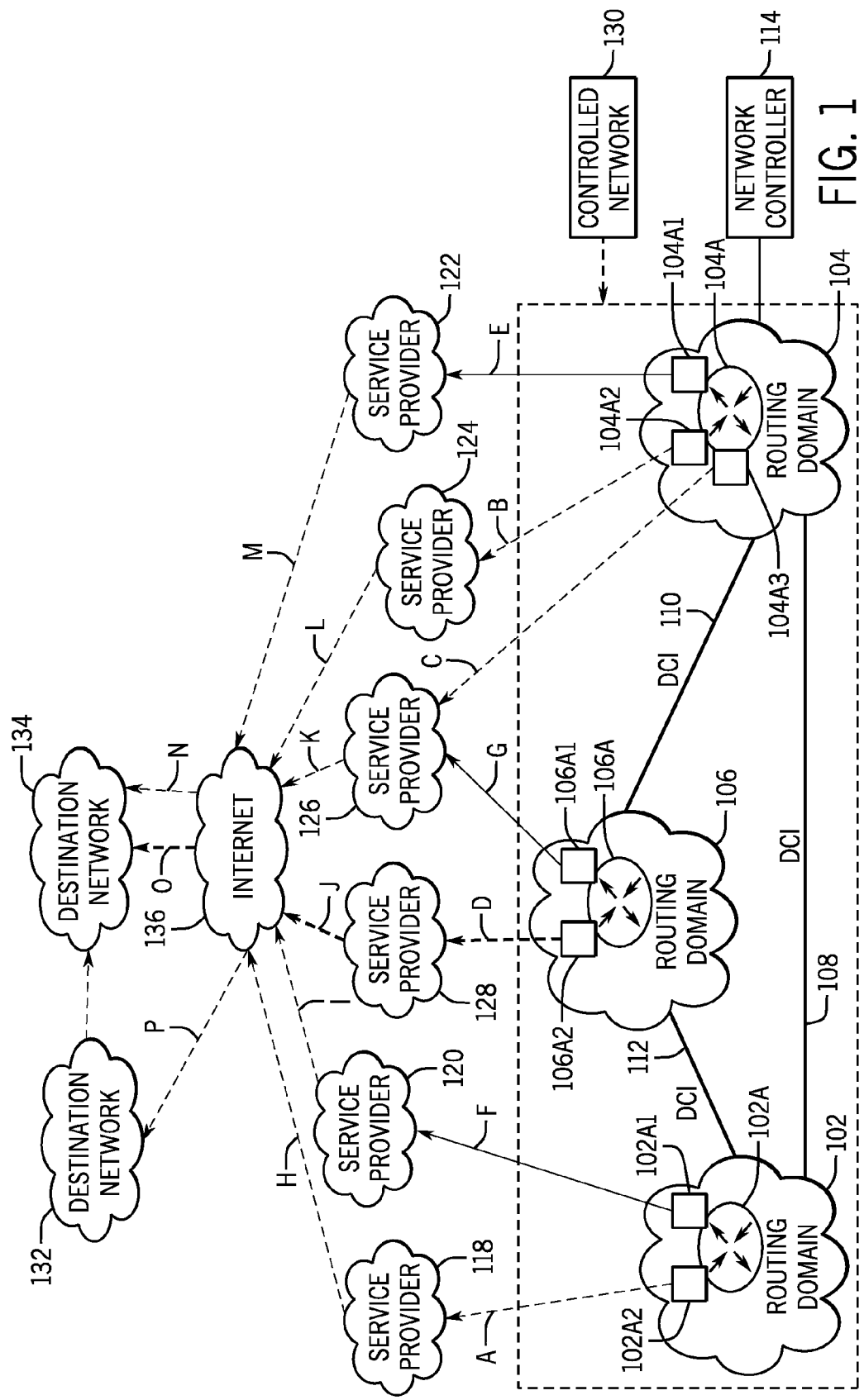
FIG. 1 illustrates a diagram of an example system for providing a platform for optimizing traffic through a (packet-switched) computer network with distributed routing domains interconnected to DCIs.

FIG. 1 illustrates a diagram of an example system 100 for providing a platform for optimizing traffic in a (packet-switched) computer network wherein multiple distributed routing domains 102, 104, 106 are shown interconnected by way of DCIs 108, 110, 112, respectively. (System 100 is an intelligent platform for performing this optimization.) Traffic represents all of data packets (or just packets) sent/received as known to those skilled in the art.

In particular, system 100 includes network controller 114, and service providers (SP) 118-120, 122-124 and 126-128 for routing traffic (i.e., packets) through routing domains 102, 104 and 106, respectively. That is, SPs 118, 120 provide service for routing domain 102. SPs 122, 124, 126 provide service for routing domain 104 and SPs 126 and 128 provide service to routing domain 106. Routing domains 102, 104, 106 each include a router (102A, 104A, 106A, respectively), and a plurality of provider interfaces (102A1, 102A2; 104A1, 104A2; 106A1, 106A2, respectively). System 100 further includes controlled network 130 and destination networks 132, 134. In this embodiment, three routing domains, six SPs, three routers, seven provider interfaces and three destinations are shown. However, those skilled in the art know that any number of these elements may be employed for system 100.

Controlled network 130 is distributed across routing domains 102, 104, 106, each of which is interconnected to each other via DCIs 108, 110, 112. Network controller 114 is connected to (communicates with) controlled network 130 and is hosted by one of the routing domains 102, 104, 106. Controlled network 130 includes many network devices (not shown) connected to routers 102A, 104A, 106A as known to those skilled in the art. Routers 102A, 104A, 106A are connected to SPs 118-128 via provider interfaces 102A1, 102A2, 104A1, 104A2, 104A2, 104A3 and 106A1, 106A2 as shown. SPs 118-124 are connected to (communicate with) destination networks 132, 134 via several communication paths A-G and H-P (through for example the Internet 136) as known to those skilled in the art. (However, in alternative embodiments, traffic may be routed through communication paths in packet-switched computer networks that do not include the Internet as known to those skilled in the art.) The communication paths (traffic routes) will be discussed in more detail below.

Controlled network 130 comprises (1) regionally distributed points of presence (POP) that form sub-networks logically grouped into routing domains 102, 104, 106 where each routing domain has one or more DCIs connections to other routing domains and one or more connections to SPs. Each routing domain includes computer servers, routers and other components including routers such as routers 102A, 104A, 106A and other network devices for example switches, servers and other networked computers and computer program modules and other software that make a network of a business or enterprise.

Network controller 114 includes one or more servers or other computers that comprise a set of software modules for implementing system 100 in accordance with embodiments of this disclosure. Network controller 114 and these modules are discussed in more detail below.

Routers 102A, 104A, 106A, as known to those skilled in the art, are components in the controlled network 130 that are used to route traffic through network. Routers 102A, 104A, 106A provide dynamic routing protocol support and IP traffic statistics reporting (export). Edge routers are routers 102A, 104A, 106A that interconnect controlled network 130 with SPs 118-128 as known to those skilled in the art.

Provider interfaces 102A1-A2, 104A1-A3, 106A1-A2, as known to those skilled in the art, are a hardware part of routers 102A, 104A, 106A. Provider interfaces 108 are used to provide communication links to the routers and/or other hardware components of SPs 118-128.

Destination networks 132, 134 are the remote networks to which traffic (packets) are intended for delivery. There are many destination networks 132, 134 as known to those skilled in the art. Different destination networks 132, 134 have different communication paths through different SPs 118-128 and correspondingly different values for the QoS characteristics for them. Therefore, for each destination network 132, 134 there might be a better communication path than the currently used one. In large networks comprising many autonomous systems, such as the Internet, there are too many destination networks 132, 134 and destination network prefixes feasibly assess all of them on an ongoing basis. Destination networks 132, 134 that are examined, probed and rerouted in the event a better alternative route is identified are chosen by network controller 114 based on relevancy and human operator policy specified in network controller 130 configuration. Determining relevancy of a destination network 132, 134 is based on one or more criteria such as current or past bandwidth usage, packet count or content, packet source or destination and so on (as examples).

As indicated above, there are alternative communication paths (e.g., routes A-G and H-P) connecting controlled network 130 to destination network 134. In order for system 100 to operate as disclosed herein, controlled network 130 must incorporate two or more routing domains with one or more alternative communication routes to a destination network to make possible re-routing of traffic (packets). In accordance with an embodiment In FIG. 1, system 100 depicts three routing domains 102, 104, 106 and two destinations 132, 134.

Routing domains 102, 104, 106 are regional sub-networks that have differentiated sets of SPs 118-128, routing information and preferences and are part of a bigger autonomous system as known to those skilled in the art. Usually routing domains naturally form in POPs. Sometimes two or more POPs are nearby and they do not differ between each other significantly and at the same time DCI located between them pose negligible QoS degradation. In this case, these POPs can be grouped logically into a single routing domain. As known to those skilled in the art, multiple routing domains may be part of a single POP when the routing data received from upstream SPs is different (due to for example and not limited to different sets of upstream providers) or if different routing policies are applied in each of them to make the routing tables differ significantly (as assessed by human operators).

Figure 2:
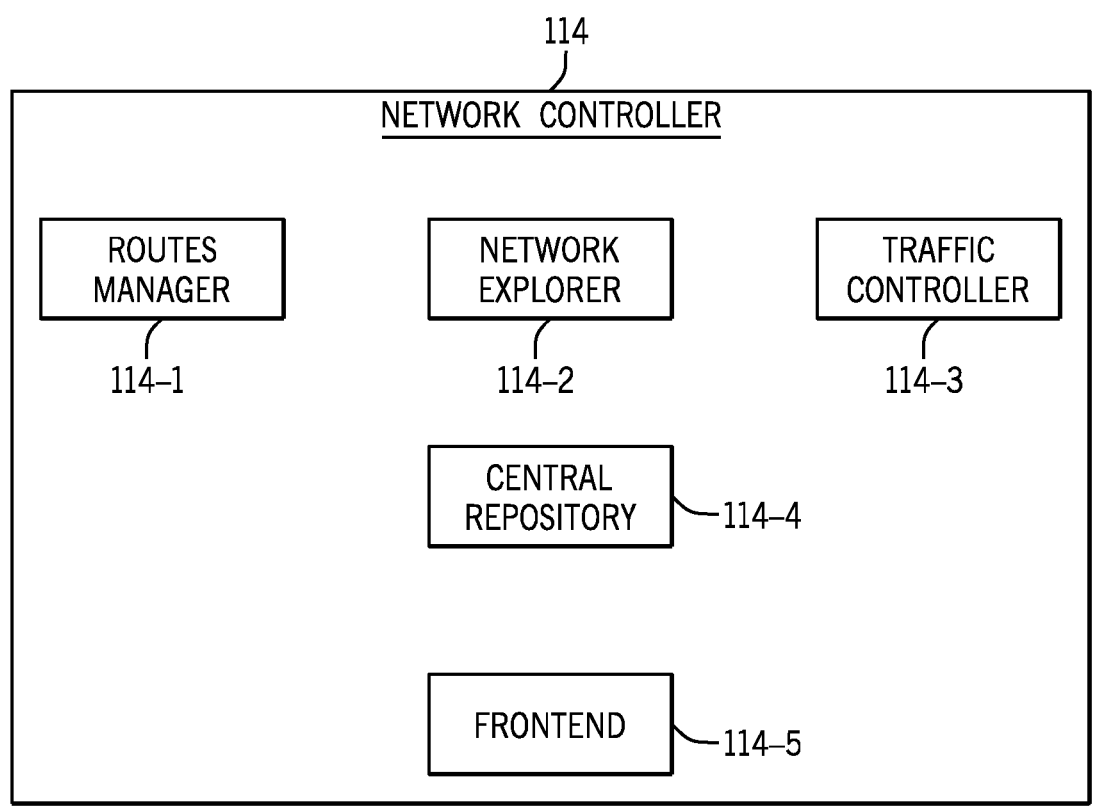
FIG. 2 illustrates the network controller of FIG. 1 wherein internal modules are shown.

Reference is now made to FIG. 2 wherein the internal modules of network controller 114 in FIG. 1 are shown in detail. As indicated above, network controller 114 is a system that includes one or more servers incorporating a plurality of computer program modules. These servers include, among other components, one or more processors for executing the plurality of computer program modules. These modules include routes manager 114-1, network explorer 114-2, traffic controller 114-3, central repository 114-4, and frontend 114-5. The modules described above or portions thereof may be incorporated on servers and/or other components that are part of or entirely separate from controlled network 130 as known to those skilled in the art. Network controller 114 is connected to controlled network 130.

Routes manager 114-1 is a module used for communicating with routers 102A, 104A, 106A for injecting routing changes via any method for automatic route management as known to those skilled in the art. An example of such protocols is Border Gateway Protocol (BGP-4) as defined in the Y. Rekhter, T. Li, S. Hares, "A Border Gateway Protocol 4 (BGP-4)", IETF RFC 4271.

Network explorer 114-2 is a module used for probing network prefixes to determine network prefix reachability and to measure and collect each network prefix QoS characteristics (also called metrics), e.g., packet loss, latency, jitter as well as other characteristics known to those skilled in the art, that can be used for routing table changes. Network explorer 114-2 stores these values of the QoS characteristics into the central repository 114-4. (Probing is distinguished from other processes that determine reachability, measure and collect data for other purposes.)

Traffic controller 114-3 is a module that (1) evaluates network prefixes carrying a specific amount of bandwidth (traffic) by using different network monitoring protocols for gathering IP traffic statistics, (2) analyzes data collected by network explorer 114-2 and (3) makes traffic re-routing decisions.

Central repository 114-4 is a module for storing module(s) configuration data (information) and transferring or storing data exchanged between the modules. Central repository 114-4 may be a database or other structured or unstructured storage solution.

Frontend 114-5 is a module for interacting with operators to enable them to configure, review, monitor and report the status of network controller 114 to an operator. That is, frontend 114-5 is a visual interaction interface between operator and network controller 114. Frontend 114-5 is described in more detail below. (The operator may be a person or automatic management, monitoring or reporting system as known to those skilled in the art.)

As indicated above, traffic controller 102-3 periodically retrieves provider interfaces 102A1-A2, 104A1-A2, 106A1-A3 traffic statistics from routers 102A, 104A, 106A and decides what network prefixes are relevant for further processing and stores this data in central repository 114-4.

In operation in brief, network explorer 114-2 probes each network prefix QoS, such as packet loss, latency, jitter, and stores the determined QoS values into the central repository 114-4. Traffic controller 114-3 retrieves from central repository 114-4 the list of network prefixes with probing results completed by network explorer 114-2 and evaluates if re-routing is necessary in accordance with an embodiment of the present disclosure. Traffic controller 114-3 evaluates if re-routing decisions shall apply for a single routing domain or globally for all routing domains and marks the decisions correspondingly with markers designated for individual routing domains or for all routing domains. Routes manager 114-1 applies the decisions made by traffic controller 114-3 to a single or multiple routers 102A, 104A, 106A correspondingly attaching the markers assigned to each re-routing decision by traffic controller 114-3. Finally, routers 102A, 104A, 106A distinguish re-routing decisions designated only for a specific routing domain and ensure its propagation only internally within the routing domain or globally and ensure re-routing decision propagation across all routing domains in the network.

Traffic controller 114-3 collects IP traffic statistics, based upon network monitoring protocols known to those skilled in the art. An example of such protocols is IP Flow Information Export (IPFIX). IPFIX is described in "Specification of the IP Flow Information Export (IPFIX) Protocol for the Exchange of IP Traffic Flow Information," B. Claise, IETF RFC 5101, January 2008. Another exemplary protocol is derived from sFlow in accordance with the protocol specifications promulgated by the sFlow.org consortium. NetFlow are yet another group of IP traffic statistics export standards. For example NetFlow version 9 is described in "Cisco Systems NetFlow Services Export Version 9," B. Claise, Ed., IETF RFC 3954, October 2004.

The statistics (i.e., the total amount of bytes sent in IP packets to particular destination network addresses) collected are aggregated into network prefixes carrying a specific amount of bandwidth based on the list of network prefixes retrieved from the central repository 114-5 per each provider interface 102A1-A2, 104A1-A2, 106A1-A3 separately.

As indicated above, frontend 114-5 is an interaction interface between operator and network controller 114. Frontend 114-5 is used for configuration, reporting and management purposes. Frontend 114-5 includes a GUI (Graphical User Interface), CLI (Command Line Interface), Statistical Reports an API (Application Programming Interface) and/or other interfaces known to those skilled in the art. As indicated above, operator can be human beings, automated systems, monitoring systems or other systems known to those skilled in the art. Operator can manage or configure the network controller 114 using the frontend 114-5, which enables adding, editing, deleting data (or other actions) used and exchanged between the modules and the configuration parameter values. This resulting configuration information is then stored in the central repository 114-5 of network controller 114 in accordance with an embodiment of the present disclosure.

A network prefix is a part of the IP address space in accordance with either IP version 4 or IP version 6 as known to those skilled in the art. Specifically, a network prefix is a network part of an IP address and network size. Data packets contain destination addresses. These destination addresses are aggregated (transformed) into network prefixes. Addresses can be aggregated into a fixed size (IPv4 or IPv6) subnet. Subnetting is performed for destination IP addresses to compose the network prefix. More details on subnets and prefixes may be found in V. Fuller, T. Li, "Classless Inter-domain Routing (CIDR)", IETF RFC 4632.

In the embodiment shown in FIG. 1 (as described above), controlled network 130 comprises routing domains 102, 104, 106. Each routing domain represents one or more sub-networks including one or more routers 102A, 104A, 106A that connect to remote destination networks 132, 134 through SPs 118-128 using designated provider interfaces 102A1-A2, 104A1-A3 and 106A2-A2. The connections A-G to the SPs are the alternative or possible routes for traffic from each routing domain. In other embodiments, there may be an very large number of destination networks each representing an autonomous system (cloud) or a sub-network designated by a network prefix as known to those skilled in the art.

The communication paths (routes connecting routing domains 102, 104, 106 with destination networks 132, 134 comprise one or more hops and the number of hops after a SP can be quite large, as known to those skilled in the art. FIG. 1 depicts only a few such hops to highlight their presence only (not the entire route). For example, FIG. 1 illustrates several communication paths that go from SPs 118-128 towards destination networks 132, 134 through Internet 136. Some if not all of these paths through Internet 136 have traversing different numbers of hops with different QoS each. The length (i.e., distance) of communication paths from a provider interface 102A1-A2, 14A1-A3, 106A1-A2 in controlled network 130 to destination networks 132, 134 will affect (a factor in) the QoS when choosing one route over another (i.e., the shorter the path, the better the QoS). DCIs 108, 110, 112 between routing domains 102, 104, 106 introduce additional QoS degradation for packets re-routed from one routing domain 102, 104, 106 to another in the event of any global re-routing decisions.

Based on the distance and other factors known to those skilled in the art, the QoS for the communication paths between each routing domain 102, 104, 106 and destination networks 132, 134 will vary. In accordance with the embodiment in FIG. 1, system 100 will determine, i.e., measure the QoS for each route in order to determine if it is the best local route and whether it is better than the current route already chosen by each routing domain 102, 104, 106. One or more alternative routes exist for each routing domain.

For purposes of the example in FIG. 1, the continuous solid arrows lines from each routing domain 102, 104, 106 represent current routes originally assigned to route packets (at the moment). FIG. 1 depicts these current routes as paths F, E, G. Only one current route exists for each routing domain. Also for purposes of this example, paths F, B, D represent the alternative routes with best QoS characteristics values for each routing domain 102, 104, 106. The best routes are determined after assessing each route's QoS values towards a specific destination network and resolving ties (conditions when one route has a better QoS value for one QoS characteristic and a worse value for the other). Again, only one best local communication path exists in each routing domain. In Communication paths A and C also represent alternative local routes but they are neither the local best or current routes towards a desired destination network.

As indicated above, FIG. 1 illustrates several communication paths (routes) in order to reach destination network 134. These paths are significantly different and may have significantly different QoS values, as known to those skilled in the art. Therefore, QoS measurements will be taken for each path and decisions will be made based on the collected QoS data. The distance (length) between routing domain and SP is a factor in QoS measurement (but not the only characteristic for QoS) as known to those skilled in the art. For example, if the QoS of routes B (from provider interface 104A2) and D (from provider interface 106A2) exceed QoS characteristics of currently implemented routes E and G (interfaces 102A2 and 104A1) in routing domains 104 and 106, respectively, it would be advantageous to re-route traffic for destination network 134 to achieve better QoS for packets flowing from these routing domains towards destination network 134. When a route is both the best route and also the current route, no re-routing decision is made.

Now, while it is clear from the example in FIG. 1 that re-routing optimizations can be made locally for routing domains 102, 104, 106, it might be possible that the a communication path (route) has QoS characteristics that are better than every other route in any routing domain. This means that the packets in the other routing domains can use the DCI links towards routing domain with the best QoS and be routed towards the destination network using this route and be more advantageous than being routed from local routing domains. This is true only if the QoS for this routing domain remains the best even after taking into account QoS degradation caused by the DCI links 108, 110, 112 between routing domains.

To determine whether a route shall utilize a DCI, system 100 will determine the QoS for the DCI. When the speed of a routing decisions is critical, the QoS for the DCI is determined in advance. The frequency of this determination will vary as appropriate for any controlled network as known to those skilled in the art. During decision making process, traffic controller 114-3 combines existing DCI QoS values with the QoS values of the individual routing domain best route to determine whether a global best route exists.

In the example system 100 in FIG. 1, route D (from 106A2) towards destination network 134 for packets originating in routing domain 102, routing domain 104 will be best if {QoS(D—106A2)++QoS(DCI 112)} is better than {QoS (F—102A1)} and {QoS(D—106A2)++QoS(DCI 110)} is better than {QoS (B—104A2)}.

The notation { . . . } above is used because QoS has many characteristics (for example packet loss, latency, number of hops on the path, jitter etc.) and all of the relevant values are taken into consideration during the comparison. More so, the "++" notation highlights a combining operator that takes into account the nature of these characteristics (some are added, subtracted, counted, multiplied, inversely multiplied etc.) with the corresponding threshold values as known to those skilled in the art to take into account.

Later on, if network controller 114 implements a re-routing decision (because it identified a better alternative to the existing current route), network controller 114 needs a mechanism to communicate the re-routing decision to controlled network 130 and to also distinguish local and global re-routing decisions that are enforced in one or all routing domains. In the embodiment in FIG. 1, network controller 114 needs to be able to differentiate the decision to re-route (e.g., "Take route D from 106A2") so that it is either enforced only by routing domain 106 or by all routing domains. Routes manager 114-1 of network controller 114 uses existing route injection techniques enforce such decisions on router 106A. Network controller 114 uses (for example) Border Gateway Protocol 4 (BGP-4) as defined in the Y. Rekhter, T. Li, S. Hares, "A Border Gateway Protocol 4 (BGP-4)", IETF RFC 4271; Open the Shortest Path First (OSPF) as defined in the J. Moy, "OSPF Version 2"; IETF RFC 2328; D. Savage, D. Slice, J. Ng, S. Moore, R. White, "Enhanced Interior Gateway Routing Protocol", IETF draft-savage-eigrp-00; Command Line interface via secure shell or telnet protocol; or Serial Port or any other protocol, port or method for configuring router 106A, by executing router-specific configuration commands. Further, the re-routing decision/policy is propagated between routers 102A, 104A, 106A by the dynamic routing protocols established between routers 102A, 104A, 106A used in order to apply the implementation to the controlled network 130. The newly injected route points to the IP address of the selected SP and the injected route includes a marker to distinguish global re-routing decisions. The marker is an agreed upon value that can be embedded in the chosen route injection techniques/protocol.

In brief, routers are instructed to exchange with other routers on the network all routing decisions injected by routes manager 114-1 that carry the global marker (for global routing decision) and only to enforce routes towards SPs that belong to their own routing domain for all routing decisions injected by routes manager 114-1 that carry the local marker.

Figure 3:
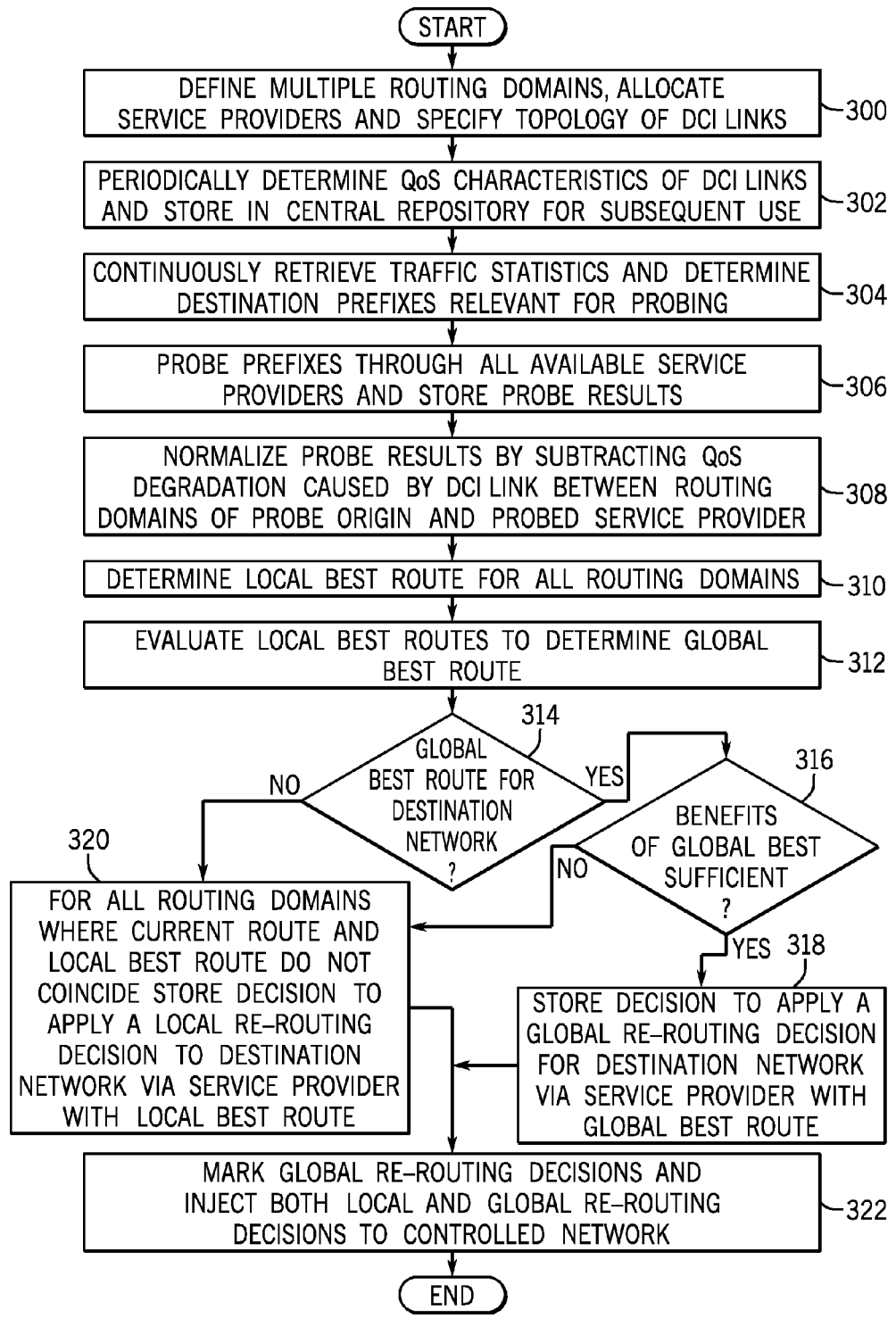
FIG. 3 illustrates an example high-level flow diagram of a process of optimizing traffic routing in multiple routing domains of the system in FIG. 1.

FIG. 3 illustrates an example high-level flow diagram of a process of optimizing routing in multiple routing domains of system 100 in FIG. 1. (As indicated above, system 100 provides an intelligent platform for performing this optimization.) In particular, execution begins at step 300 wherein a human operator defines (sets up) routing domains that receive traffic and allocates SPs to provide service to them for routing such traffic, provides the topology of DCI links between routing domains and designates markers for global and local re-routing decisions. A human operator can use frontend 114-5 of network controller 114 to perform this task. Additionally, the human operator also configures the routers to instruct how they must handle re-routing decisions that will be injected by routes manager 114-1, carrying the global or the local re-routing decisions markers. (Local re-routing decisions are within a local domain and global re-routing decisions are for all routing domains as known to those skilled in the art.)

Next, execution moves to step 302 wherein values of QoS characteristics for DCI links are periodically determined and stored in central repository for subsequent use. These characteristics include packet loss, latency and bandwidth usage (for example). This step can be performed either (1) manually by a human operator and subsequently added to network controller 114 via frontend 114-5 or (2) automatically by network controller 114.

Next, execution moves to step 304 wherein traffic controller 114-3 continuously monitors network traffic for all provider interfaces and aggregates statistics per destination network prefix and stores the statistics in central repository 114-4. In addition, traffic controller 114-3 evaluates the collected statistics such as volume, policies, number of packets, type of content, past probes etc. and determines appropriate destination network prefixes to probe. Traffic controller 114-3 queues relevant destination network prefixes for probing in central repository.

Next, execution moves to step 306 wherein network explorer 114-2 identifies proper destination network prefixes to probe from central repository 114-4 and probes the identified destination network prefix through all configured SPs. During probing, network explorer 114-2 determines values for QoS characteristics. This ensures that all characteristics for all routes are measured.

Next, execution moves to step 308 wherein network explorer 114-2 normalizes the QoS values of probe results for each routing domain by subtracting the QoS degradation introduced by the DCI link between routing domains of a) probe origin (routing domain where network explorer 114-2 generated the probes) and the b) probed SP (routing domain where the SP is connected).

Next, execution moves to step 310 wherein traffic controller 114-3 finds a local best route for each routing domain for each destination network with complete probe results. The local best route is one of the routes from all available routes in a routing domain with best QoS. QoS characteristics are examined in a particular order so that comparison ties can be resolved. This means that when a QoS value of one local route is better and another QoS value is worse when comparing two alternative SPs then the ordering of QoS characteristics makes the overall decision explicit. In the example in FIG. 1, three domains 102, 104, 106 are shown. For routing domain 102, the best local route is shown as A (dashed arrow line—from provider interface 102A2). For routing domain 104, the best local route is shown as B (dashed arrow line—from provider interface 104A2) and for routing domain 106, the best local route is shown as D (dashed arrow line—from provider interface 106A2). Routes A, B and D are the best routes for traffic because they have the best QoS for those corresponding routing domains. This is described in more detail below.

Next, execution moves to step 312 wherein the local best routes are evaluated to determine if a global best route exists for re-rerouting traffic. That is, for each routing domain, traffic controller 114-3 verifies if re-routing traffic from other routing domains will improve those other routing domains QoS values as compared with currently determined local best. This takes into account the combined QoS degradation introduced by the DCI link between the candidate routing domain and those other routing domains.

Next, execution moves to step 314 wherein it is determined if there exists a global best route or not for this destination network prefix. Thus, after accounting for QoS degradation introduced by the DCI link, if the local best route is better than that routing domain local best route for all routing domains, then that local route is the best global route and execution moves to decision step 316. If not, execution moves to step 314.

If at step 314 a global best route has been found for this destination network, execution moves to step 316 wherein a subsequent decision is made if the benefits of the global re-routing decision are sufficient to justify change in route. This is checked because routing packets from one routing domain to another (in the case of a global re-routing decision) using the DCI links that may have limited capacity and as such are incurring a small cost. For example, if the original route has a 2% packet loss and a routing change will result in only a 1% packet loss, a routing change may not be worthwhile.

If at step 316 a global best route has been found for this destination network, execution moves to step 318 wherein a global re-routing decision is made and recorded in central repository 114-4. In the example in FIG. 1, the best global route is depicted as route D (bold dashed arrow line).

If at steps 314 or 316 a decision against a global best route has been made for this destination network, execution moves to step 320 wherein local re-routing decisions are made only for those routing domains where the best route and current route do not coincide for a routing domain. These decisions are stored as local re-routing decisions in central repository 114-4. None, one or more re-routing decisions can be made at this step.

Next, execution moves to step 322 wherein routes manager 114-1 retrieves the decisions to reroute traffic for a destination network, applies global and local markers to re-routing decisions accordingly and injects these decisions to the controlled network. For example, routers 102A, 104A and 106A on controlled network 130 communicate global re-routing decisions to all other routers and local re-routing decisions only to routers in the same routing domain. Routers then start enforcing received re-routing decisions.

It shall be pointed out that steps 304-322 are executed on an ongoing basis and as such many destination network prefixes are examined and some of them are re-routed when routes with better values for QoS characteristics are identified.

The process shown in FIG. 3 is broken down in detail in FIGS. 4-8 below.

Figure 4:
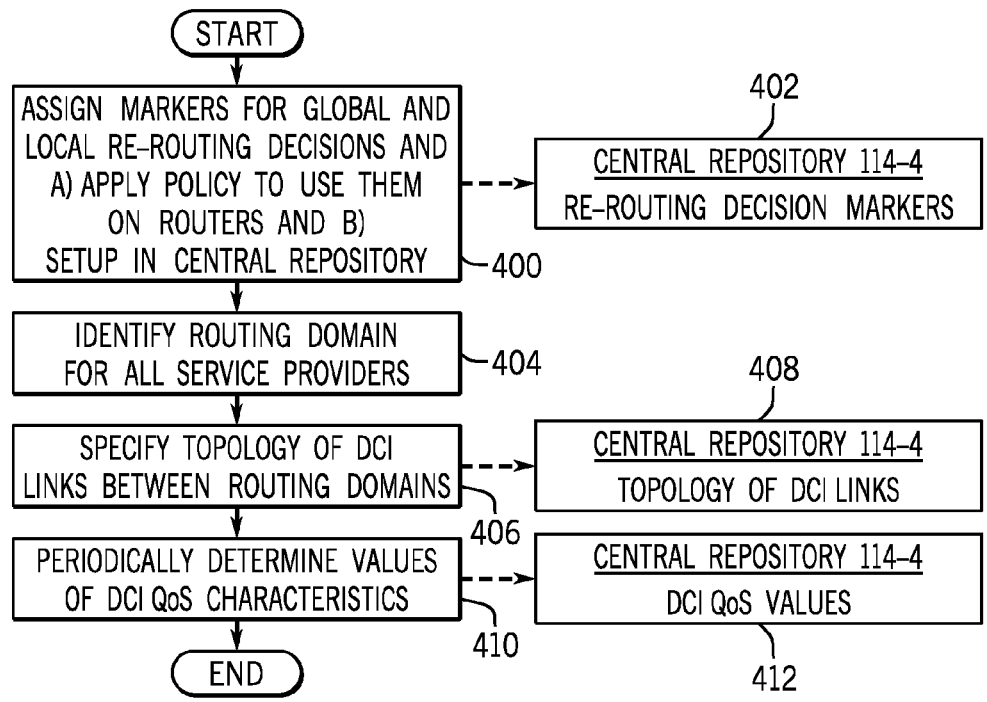
FIG. 4 illustrates a detailed flow diagram of the optimization process of the system in FIG. 1 involving the configuration and periodic assessment of the DCI QoS values.

FIG. 4 illustrates a detailed flow diagram of the optimization process of the system in FIG. 1 involving the configuration and periodic assessment of the DCI QoS values. FIG. 4 describes steps 300 and 302 of FIG. 3 in detail.

In particular, execution begins at step 400 wherein a human operator assigns markers for global and local re-routing decisions. The human operator will also a) instruct the routers how to handle re-routing decisions marked with them (so that re-routing decisions marked as local are only propagated and enforced within the routing domain and re-routing decisions marked as global are propagated and enforced within the routing domain as well as in the other routing domains) also b) uses frontend 114-5 and sets up routing domains by indicating the global and local markers that will be used to distinguish global and local re-routing decisions. The markers are stored in central repository as depicted by block 402.

Next, execution moves to step 404 wherein the human operator identifies the routing domain for each SP.

Next, execution moves to step 406 wherein the human operator identifies the topology of DCI links by indicating the two routing domains linked by each DCI. The topology of DCI links is stored in central repository 114-4 as indicated by block 408.

Next, execution moves to step 410 wherein the human operator or an automated tool determines values of QoS characteristics of each DCI link. The determined DCI link QoS values are stored in central repository 114-4 for further use as depicted in block 412. Execution then ends.

Figure 5:
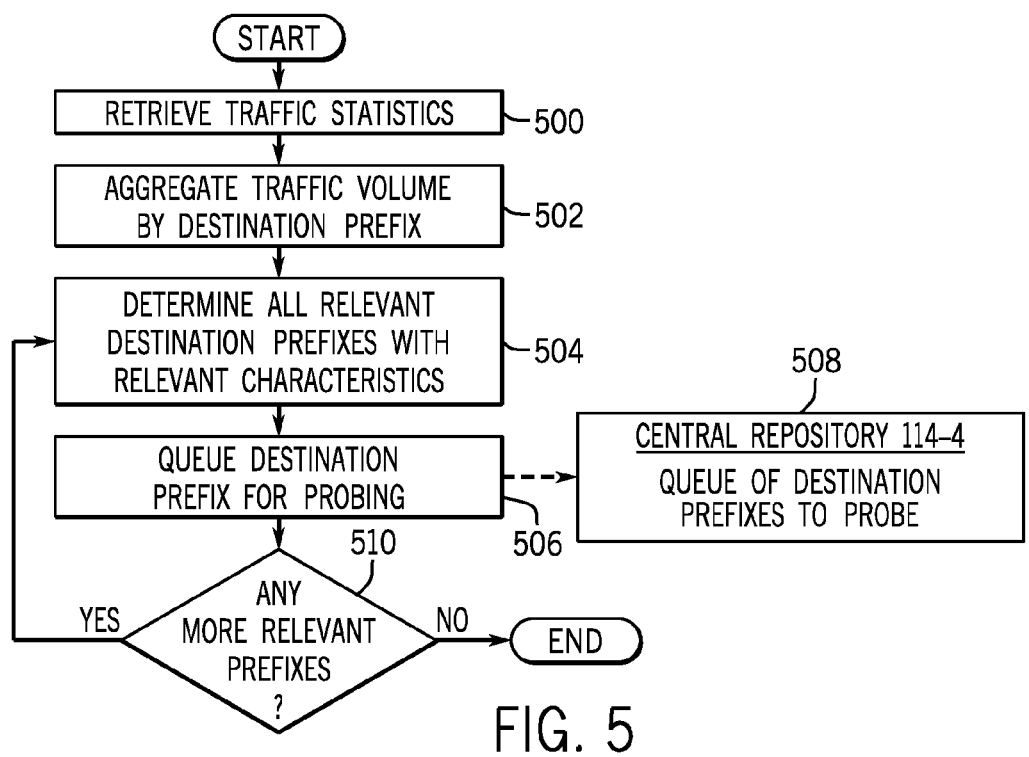
FIG. 5 illustrates a detailed flow diagram for determining relevant destination networks (prefixes) for probing in the system in FIG. 1.

FIG. 5 illustrates a detailed flow diagram for determining relevant destination networks (prefixes) for probing in the system in FIG. 1. The flow involves the statistics analysis (cycle) of traffic to determine the destination network prefixes for probing. (FIG. 5 depicts in detail step 304 in FIG. 3.) System 100 must examine which destination networks to probe. Some destination networks are not relevant for some routing domains.

In particular, execution begins at step 500 wherein traffic controller 114-3 retrieves traffic statistics from controlled network 130.

Next, execution moves to step 502 wherein traffic controller 114-3 aggregates traffic statistics per destination network prefix.

Next, execution moves to step 504 wherein traffic controller 114-3 determines all destination network prefixes with relevant characteristics including, for example, volume, number of packets, preferred destination etc.

Next, execution moves to step 506 wherein traffic controller 114-3 appends a relevant destination network prefix to the queue of destination network prefixes to probe and store them in central repository 114-4 (depicted by block 508).

Next, execution moves to step 510 wherein traffic controller examines if there are any other destination network prefixes that are relevant. If there are more relevant destination network prefixes, then execution returns to step 504. Otherwise this cycle of statistics analysis is finished.

It shall be noted that the steps (i.e., statistics analysis) of traffic flow execute as a cycle with high frequency. Once a cycle has finished, a new cycle will be re-run in a short interval of time, for example in one minute. However, any interval of time can be used as known to those skilled in the art.

Figure 6:
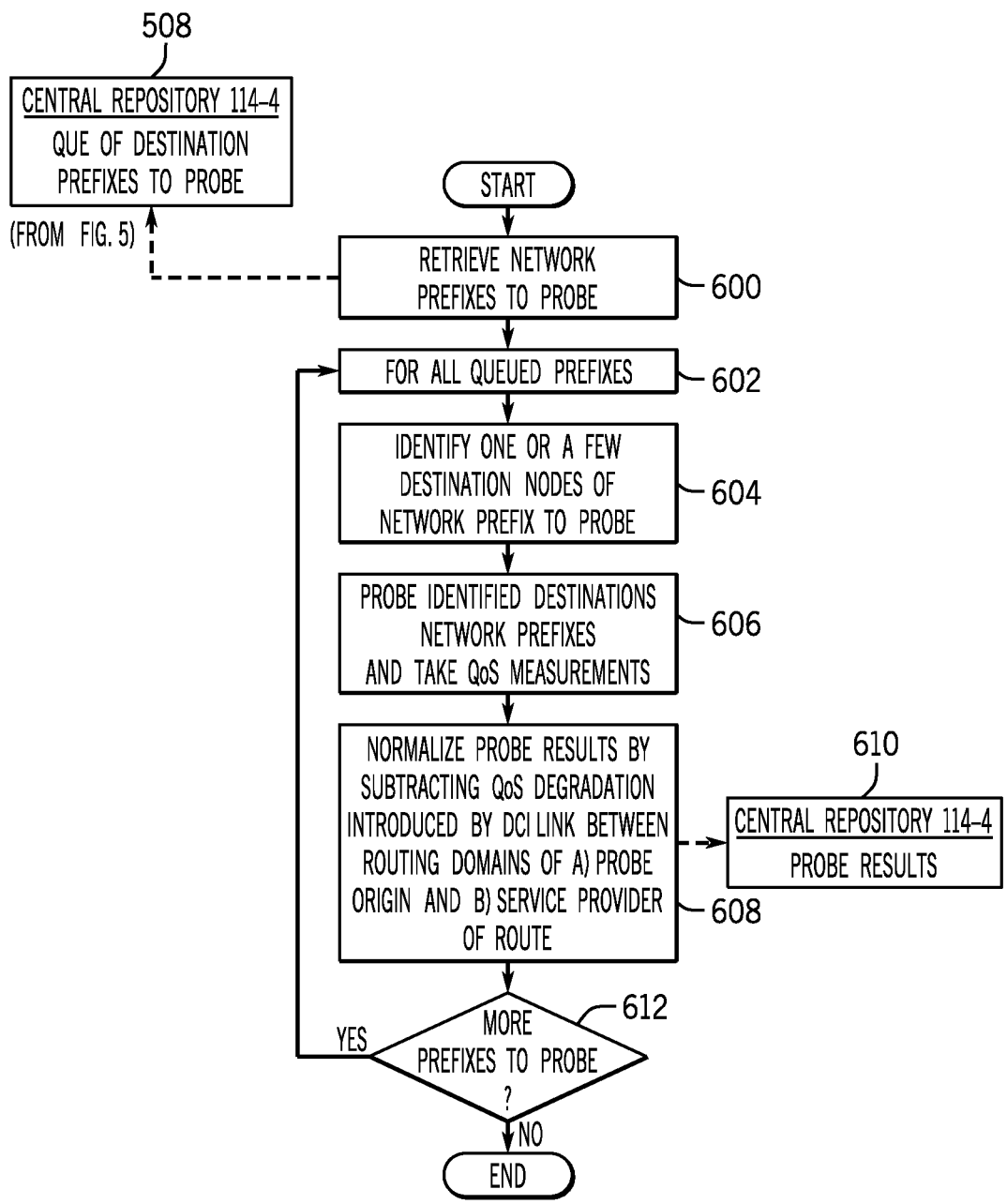
FIG. 6 illustrates a detailed flow diagram for probing of relevant destination networks (prefixes) in FIG. 1.

FIG. 6 illustrates a detailed flow diagram for probing of relevant destination networks (prefixes) in FIG. 1 to determine their QoS characteristics. (FIG. 6 are details for steps 306 and 308 in FIG. 3.) In particular, execution begins at step 600 wherein network explorer 114-2 retrieves from central repository 114-4 destination network prefixes queued for probing. The queue has been supplemented with destination network prefixes to probe by traffic controller 114-3 stored central repository 114-4 as shown in FIG. 5 as depicted by block 508.

Next, execution moves to step 602 wherein network explorer 114-2 starts a loop for all retrieved destination network prefixes.

Next, execution moves to step 604 wherein network explorer 114-2 identifies one or more nodes that are part of the destination network prefix.

Next, execution moves to step 606 wherein network explorer 114-2 sends probing packets towards identified nodes and takes measurements for each of the QoS characteristics. Probing packets can be different control IP or TCP packets that use different algorithms as known to those skilled in the art.

Next, execution moves to step 608 wherein network explorer 114-2 normalizes probing results (measurement values of QoS characteristics) by subtracting QoS degradation values introduced by the DCI link between routing domains a) of probe origin and b) of SP residence. It shall be pointed out that in the event that network explorer 114-2 resides in the same routing domain as the probed SPs then there will be no DCI link to account for and the normalization step can be assumed to subtract zero from those probe results. As known to those skilled in the art, one or more instances of network explorer 114-2 can run simultaneously in different routing domains with each configured to probe only a subset of the SPs that service controlled network 130. Network explorer 114-2 stores probe results (measurement values of QoS characteristics) for destination network prefix in central repository 114-4 as depicted by block 610.

Next, execution moves to step 612 wherein network explorer 114-2 verifies if there are any other destination network prefixes to probe. If yes, then execution returns to step 602 where the loop repeats (steps 602-608) more destination network prefixes are probed. Otherwise, the probing cycle ends.

It is noted that this flow diagram in FIG. 6 can be adjusted, i.e., fine-tuned in such a way that there are always destination network prefixes to probe so that the probing cycle is executed continuously. Also, the probing cycle can be configured to re-start periodically if it stopped so that newly queued destination prefixes are probed.

Figure 7A:
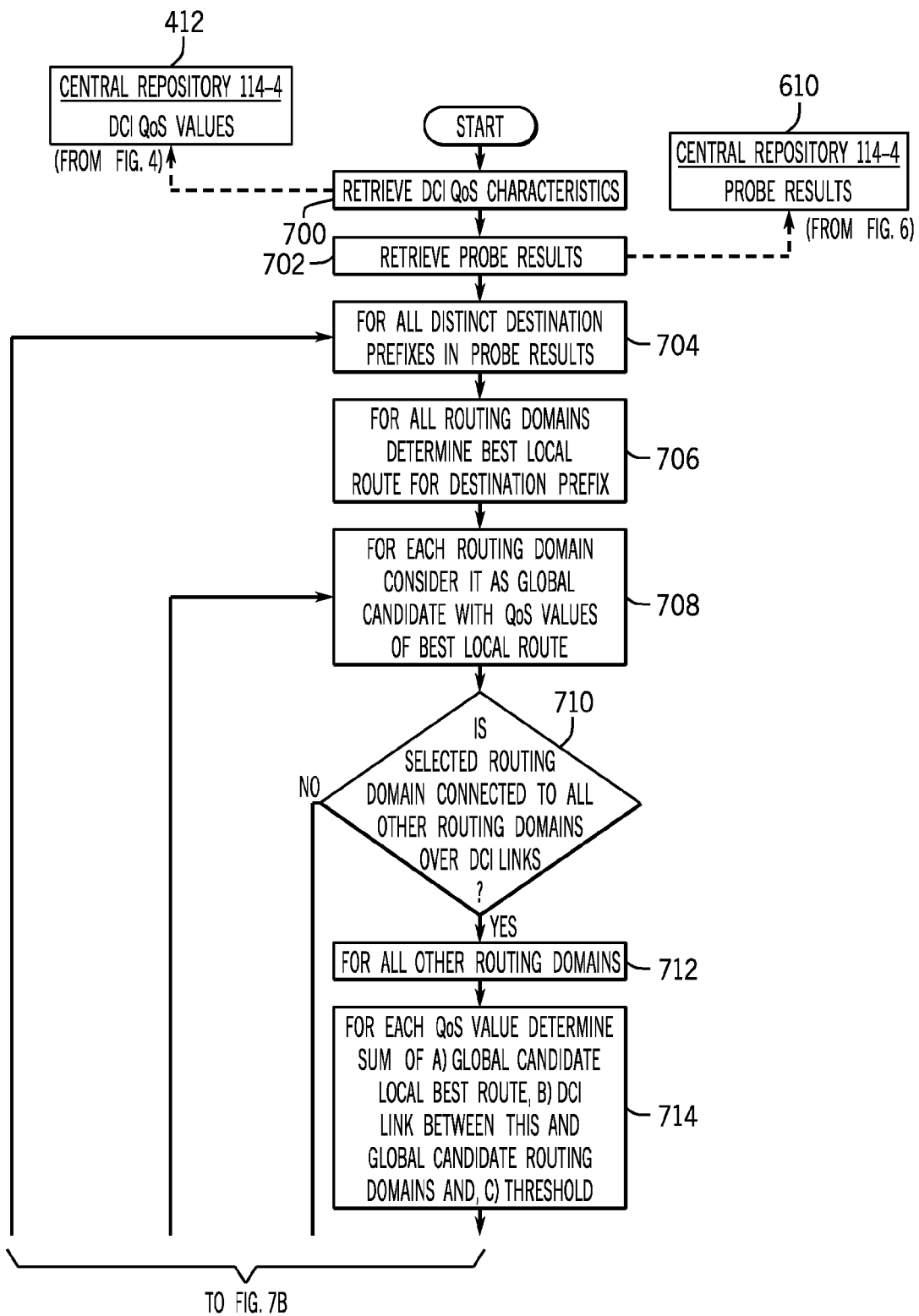
FIG. 7A-7B illustrates a detailed flow diagram for determining global or local routing decisions that will improve quality of service.
Figure 7B:
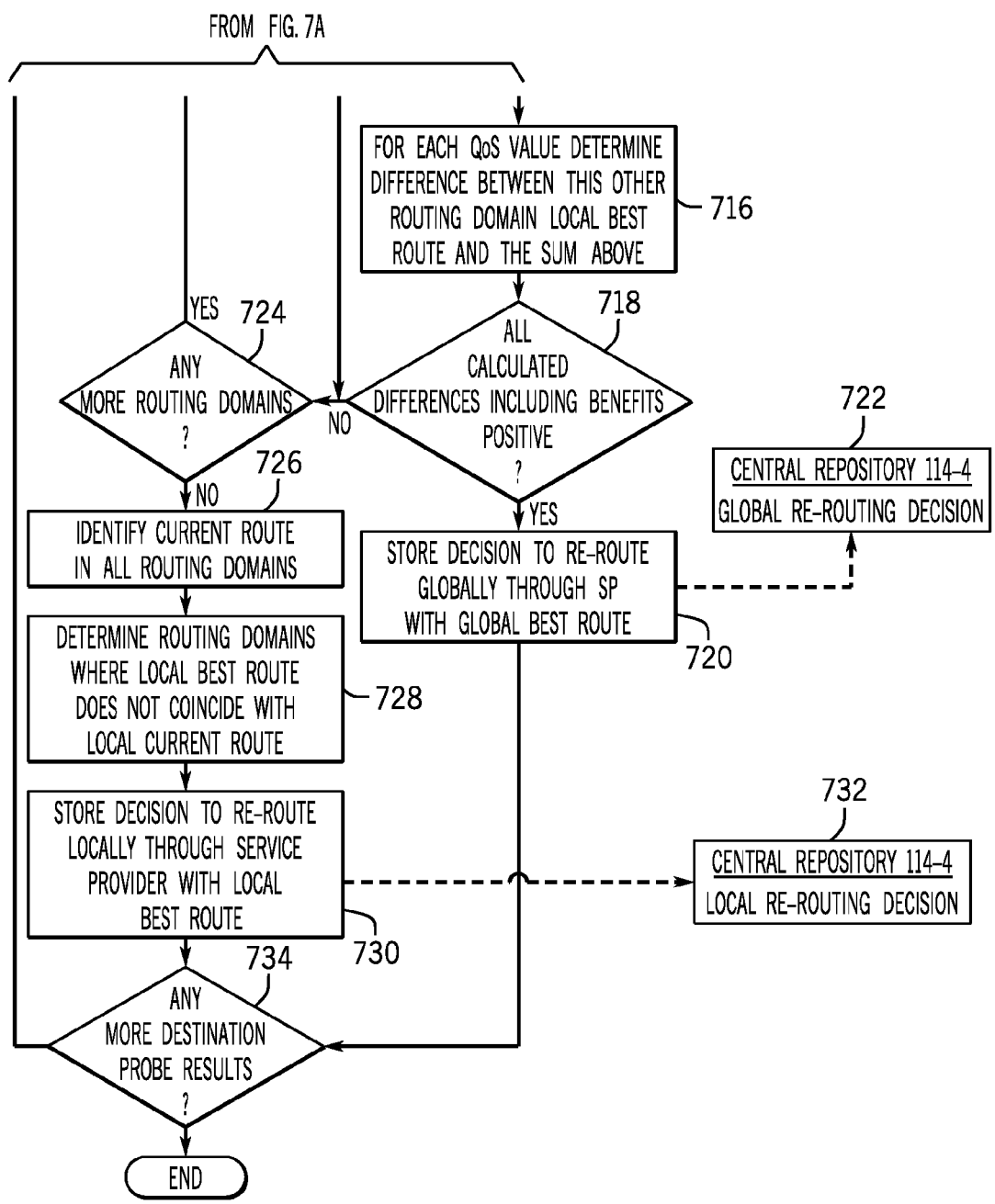

FIG. 7A-7B illustrates a detailed flow diagram for determining global or local routing decisions that will improve quality of service. That is, FIGS. 7A-7B illustrates detailed steps for the routing decisions cycle (details for steps 310-320 in FIG. 3). In particular, execution begins at step 700 wherein a traffic controller 114-3 retrieves values of DCI QoS characteristics from central repository 114-4. The values of DCI QoS characteristics have been stored in central repository 114-4 by the periodic process depicted in FIG. 4, represented by block 414.

Next, execution moves to step 702 wherein traffic controller 114-3 retrieves completed probe results from central repository 114-4. The probe results have been stored in central repository 114-4 by network explorer 114-2 in FIG. 6 as depicted by block 612.

Next, execution moves to step 704 wherein traffic controller 114-3 starts a loop for all distinct destination network prefixes with completed probe results.

Next, execution moves to step 706 wherein traffic controller 114-3 determines the best local route in each routing domain (e.g., routing domains 102, 104, 106). As indicated above, the best local routes for domains 102, 104, 106 are A, D and B, respectively based on QoS characteristics.

Next, execution moves to step 708 wherein traffic controller 114-3 loops through all routing domains and sets each as candidate for a global best route. Routes A, D and B are set as candidates in the example in FIG. 1.

Next, execution moves to step 710 wherein traffic controller 114-3 verifies that a candidate global best routing domain is connected via DCI links to all other routing domains. If no, then this candidate is discarded and execution then moves to step 724 wherein a next candidate global best will be selected if available. However, if a candidate is connected to all other routing domains via DCI links, execution moves to step 712 wherein traffic controller 114-3 loops through all other (non-candidate) routing domains.

Next, execution moves to step 714 wherein traffic controller 114-3 determines the sum of QoS values for a) candidate global best; b) DCI link between candidate global best routing domain and other routing domain; and c) threshold value that takes into account for the precision in measurement as known to those skilled in the art. These QoS values are calculated for each QoS characteristic (e.g., packet loss, latency and bandwidth usage). It shall be mentioned that when QoS degradation is allowed for a specific (less important) characteristic, then the threshold value for this characteristic can be set to a negative value thus allowing a controlled amount of degradation. If a threshold is greater than zero, then we compensate for inaccuracy in measurement. Threshold is selected by an operator as desired for stability as known to those skilled in the art.

Next, execution moves to step 716 wherein traffic controller 114-3 determines the difference between the QoS value of a) this other routing domain and b) sum calculated at step 714. These differences are calculated for each QoS characteristic.

Next, execution moves to step 718 wherein traffic controller 114-3 verifies if all the differences calculated at step 716 are positive. This also takes into consideration determining utility (benefits) of the global re-routing decision compared minus the threshold value. Utility (benefits) are calculated as a formula based on constants, coefficients, step values and other values of QoS characteristics known to those skilled in the art. If all the differences are positive, then re-routing traffic through DCI link from the other routing domain (with the introduction of the DCI link QoS degradation) is still better for controlled network 130 than using local best routes.

If at step 718 the differences identified for ALL QoS characteristics are positive, then execution moves to step 720 wherein traffic controller 114-3 registers a decision to re-route through the candidate global best route for this destination network prefix. The decision is stored in central repository 114-4 as depicted in block 722. There is no need to further examine the probing results for this destination network prefix and execution moves to the end of the loop at decision step 734.

If at step 718 one or more differences are negative, then execution moves to step 724 wherein it is determined if there is an available routing domain that can be selected as a next candidate global best.

If at step 724 no more routing domains for a candidate global best are available, then execution moves to step 726 wherein traffic controller 114-3 identifies current routes in each routing domain.

Next, execution moves to step 728 wherein traffic controller 114-3 determines the routing domains where local best routes do not coincide with current routes.

Next, execution moves to step 730 wherein traffic controller 114-3 registers decisions to re-route for those routing domains where local best route does not coincide with current route. The decisions are stored in central repository 114-4 as depicted by block 732.

Next, execution moves to step 734 wherein traffic controller 114-3 moves to the next probe result in the loop started at block 704. In the event that there are no other probing results, the decisions cycle ends.

It is noted that the decisions cycle above can be restarted periodically so that new probing results are examined in a subsequent cycle. The periodicity can be set at 1 minute or any other time interval as appropriate for controlled network 130, as known to those skilled in the art.

Figure 8:
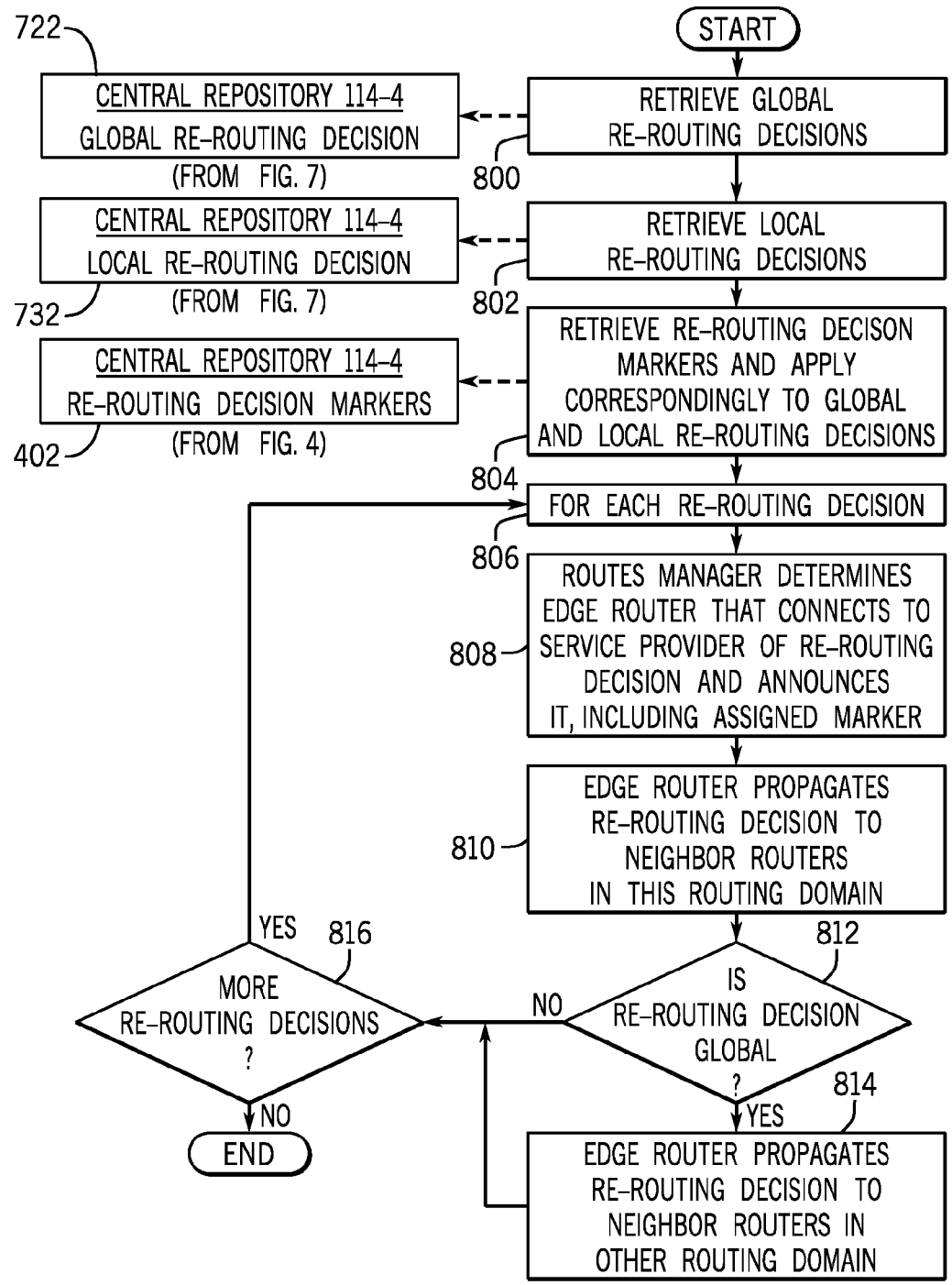
FIG. 8 illustrates a detailed flow diagram for implementing re-routing decisions in all routing domains.

FIG. 8 illustrates a detailed flow diagram for implementing re-routing decisions (cycle) in all routing domains. (The flow diagram is a detailed break down for step 322 in FIG. 3) In particular, execution begins at step 800 wherein routes manager 114-1 retrieves global re-routing decisions from central repository 114-4. The global routing decisions have been store in central repository 114-4 by the optimization process depicted in FIG. 7, represented by block 722.

Next, execution moves to step 802 wherein routes manager 114-1 retrieves the local re-routing decisions from central repository 114-4. The local re-routing decisions have been stored in central repository 114-4 by the optimization process depicted in FIG. 7 by block 732.

Next, execution moves to step 804 wherein routes manager 114-1 applies the corresponding markers to global and local re-routing decisions. The markers are retrieved from central repository 114-4 and have been stored there at setup process in FIG. 4 depicted by block 402.

Next, execution moves to step 806 wherein routes manager 114-1 examines each re-routing decision in a loop.

Next, execution moves to step 808 wherein routes manager 114-1 determines the edge router where an SP with re-routed traffic is connected and announces the decision to it including the assigned marker.

Next, execution moves to step 810 wherein edge router propagates the re-routing decision to all neighboring routers in the same routing domain. Routers start enforcing the re-routing decision by routing packets addressed to destination networks through the re-routing decision SP.

Next, execution moves to decision step 812 wherein edge router verifies if re-routing decision is a global one.

If at step 812 edge router identified a global re-routing decision, execution moves to step 814 wherein edge router propagates re-routing decision to neighboring routers in the other routing domains. Routers start enforcing the re-routing decision by routing packets addressed to destination networks through the re-routing decision SP.

If at step 812 edge router identified a local re-routing decision (and after step 814), execution moves to decision step 816 wherein an edge router moves to the next decision to re-route traffic, or in the event that there are no more re-routing decisions the re-routing cycle ends.

Figure 9:
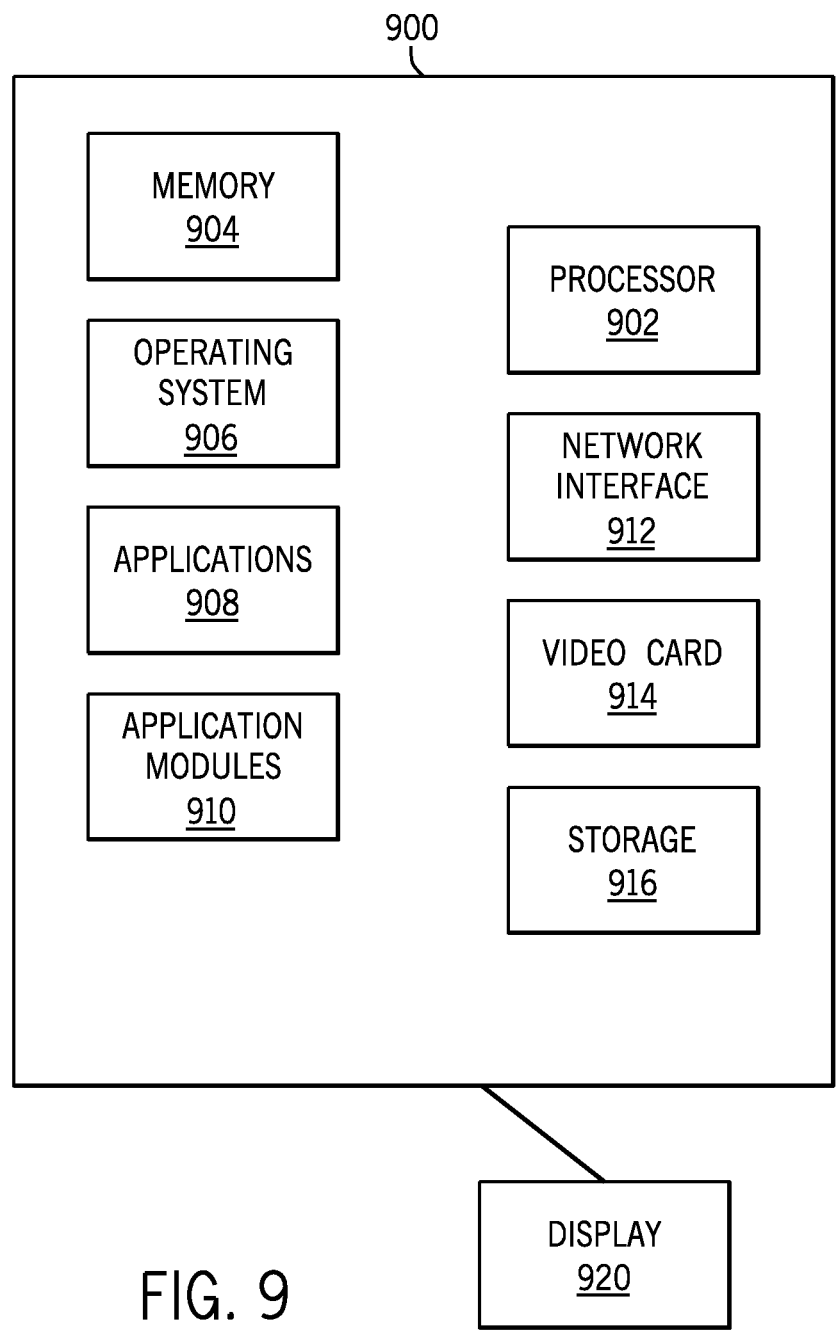
FIG. 9 illustrates a block diagram of a general-purpose computer to support the embodiments of the systems and methods including the computer program modules disclosed in this application.

FIG. 9 illustrates a block diagram of a general-purpose computer 900 to support the embodiments of the systems and methods disclosed in this application. In a particular configuration, computer 900 may be a server, as known to those skilled in the art, as described above that is configured to enable part or all of the execution of the computer program modules (software) or application steps in the embodiments disclosed above. The computer 900 typically includes at least one processor 902 and system memory 904. The system memory 904 may store instructions for execution by processor 902, an operating system 906 and one or more application platforms 908, such as Java and one or more modules, software components, applications 910 or parts thereof. The computer will include one or more communication connections such as network interfaces 912 to enable the computer to communication with other computers over a network, storage 916 such as a hard drives, video cards 914 and other conventional components known to those skilled in the art. This computer 900 typically runs Unix or Microsoft as the operating system and include TCP/IP protocol stack (to communicate) for communication over the Internet as known to those skilled in the art. A display 920 is optionally used.

It is to be understood that the disclosure teaches examples of the illustrative embodiments and that many variations of the invention can easily be devised by those skilled in the art after reading this disclosure and that the scope of the present invention is to be determined by the claims below.

I claim:

1. A computer implemented method of providing a platform for optimizing traffic on a computer network including a plurality of routing domains that route the traffic to one or more destination networks, the plurality of routing domains interconnected via one or more data center interconnect links, the method comprising:

defining a plurality of service providers that are able to route traffic to a destination network via the plurality of service providers;

identifying each service provider of the plurality of service providers that is capable of routing the traffic from the plurality of routing domains to the destination network;
determining values for QoS characteristics of the one or more data center interconnect links;
determining values for QoS characteristics of routes originating from each service provider of the plurality of service providers that is capable of routing the traffic from the plurality of routing domains to the destination network; and
determining whether the traffic for the destination network will be re-routed from a first service provider to a second service provider of the plurality of service providers based on the values of the QoS characteristics for (1) each of the routes originating from service providers of the plurality of service providers and (2) the one or more data center interconnect links.

2. The method of claim 1 further comprising probing each service provider that is capable of routing the traffic to the destination network, wherein the probing includes the each service provider of the plurality of service providers that is capable of routing the traffic from the plurality of routing domains to the destination network.

3. The method of claim 1 further comprising re-routing the traffic to at least one service provider of the plurality of service providers based on the values for QoS characteristics of the one or more data center interconnect links and the values for QoS characteristics of routes originating from each of the service providers or the plurality of service providers, the re-routing includes sending the traffic from the first routing domain to the second routing domain via a data center interconnect.

4. The method of claim 2 wherein probing includes:
sending control packets to the destination network through the plurality of service providers that are able to send traffic to the destination network; and
receiving acknowledgement from the destination network that the control packets were received along with time elapsed; and
determining values for QoS characteristics for the routes originating from each service provider based on sent control packets and received acknowledgements.

5. The method of claim 1 wherein determining values for the QoS characteristics includes measuring bandwidth information.

6. The method of claim 3 wherein the at least one service provider of the plurality of service providers has a value for QoS characteristic better than the values for the same QoS characteristic for each of the other service providers of the plurality of service providers.

7. A method of providing a platform for optimizing traffic on a computer network including a plurality of routing domains that route the traffic to one or more destination networks through a plurality of service providers, the method implemented in one or more servers configured to execute the method, the method comprising:
identifying a plurality of service providers that are capable of routing the traffic from a first routing domain and a second routing domain to the destination network, wherein the first and second routing domains are interconnected to through a data center interconnect link;
probing the destination network between (1) the first and second routing domains and (2) the destination network to determine the values for QoS of routes originating from the plurality of service providers; and
determining whether to route the traffic through a first service provider of the plurality of service providers instead of through a second service provider of the plurality of service providers based on the values for QoS of routes originating from the first and second service providers, respectively.

8. The method of claim 7 further comprising determining values for QoS characteristics of the data center interconnect link.

9. The method of claim 8 wherein the route is determined based on the values for the QoS of routes originating from the first and second service providers and the values for QoS characteristics of the data center interconnect link.

10. The method of claim 7 wherein the first and second service providers are configured to route traffic from the first routing domain to the destination network.

11. The method of claim 7 wherein the first and second service providers are configured to route traffic from the first and second routing domains, respectively to the destination network.

12. A system for providing a platform for optimizing traffic on a computer network including a plurality of routing domains that route the traffic to one or more destination networks through a plurality of service providers, the system including one or more servers storing computer executable instructions that when executed by the one or more servers, cause the one or more servers to:
identify a plurality of service providers that are capable of routing the traffic from a first routing domain and a second routing domain to the destination network, wherein the first and second routing domains are interconnected to through a data center interconnect link;
probe the destination network between (1) the first and second routing domains and (2) the destination network to determine values for QoS of routes originating from the plurality of service providers; and
determine whether to route the traffic through a first service provider of the plurality of service providers instead of through a second service provider of the plurality of service providers based on the values for the QoS of the routes originating from the first and second service providers, respectively.

13. The system of claim 12 wherein the executable instructions cause the one or more servers to determine values for QoS characteristics of the data center interconnect link.

14. The method of claim 12 wherein the route is determined based on the QoS of routes originating from the first and second service providers and the values for the QoS characteristics of the data center interconnect link.

15. The method of claim 12 wherein the first and second service providers are configured to route traffic from the first routing domain to the destination network.

16. The method of claim 12 wherein the first and second service providers are configured to route traffic from the first and second routing domains, respectively to the destination network.

17. A system for providing a platform for optimizing traffic on a controlled network including a plurality of routing domains that route the traffic to one or more destination networks through a plurality of service providers, the plurality of routing domains interconnected by one or more data center interconnect links, the system including one or more servers storing computer program modules to be executed by the one or more servers, the modules comprising:

(a) a first module for identifying the flows of traffic that are routed from the plurality of routing domains to a destination network through the plurality of service providers; and
(b) a second module for probing the plurality of service providers to determine values for QoS characteristics of all routes of the traffic to the destination network; and
wherein the first module is further for determining a best route of all routes for the traffic based on the values for QoS characteristics.

18. The system of claim 17 wherein the first module is further for determining values for QoS characteristics of the data center interconnect link.

19. The system of claim 18 wherein the first module is further for determining best route for the traffic based on the values for QoS characteristics and QoS of the data center interconnect link.

20. The system of claim 19 wherein the first module is further for applying the best route for routing the traffic.

21. The system of claim 17 wherein the first module is a traffic controller.

22. The system of claim 17 wherein the second module is a network explorer.

23. A system for providing a platform for optimizing traffic on a computer network including a plurality of routing domains that route the traffic to one or more destination networks through a plurality of service providers, the system including one or more servers storing computer programs steps to be executed by the one or more servers, the steps comprising:
  (a) configuring service providers capable of routing traffic to a destination network, wherein configuring includes identifying one or more service providers that are capable of routing traffic to the destination network from a second routing domain;
  (b) configuring topology of a data center interconnect link interconnecting the first and second routing domains;
  (c) periodically determining values for QoS characteristics of the data center interconnect link;
  (d) determining relevant flows of traffic routed towards the destination network to determine one or more service providers that route traffic from the first routing domain to the destination network and one or more service providers that route traffic from the second routing domain;
  (e) determining values for QoS characteristics of routes originating from one or more service providers that route traffic from first and second routing domains to the destination network;
  (f) identifying a service provider that currently routes traffic from the first routing domain and a service provider currently routes or is capable or routing traffic from the second routing domain to the destination network; and
  (g) determining if the traffic currently routed from the first routing domain should be re-routed through the second routing domain based on the values for QoS characteristics of routes originating from the one or more service providers.

24. The system of claim 23 wherein the step (g) further includes determining if the traffic currently routed from the first routing domain should be re-routed through the second routing domain based on the values for QoS of a data center interconnect (DCI) link and routes originating from the second routing domain.

25. A system for providing a platform for optimizing traffic through a computer network having first and second distributed routing domains interconnected through a data center interconnect link, the system comprising one or more servers storing method steps to be executed by the one or more servers, the method steps comprising:
  determining values for QoS characteristics for all routes of traffic routed from first and second routing domains to a destination network; and
  re-rerouting packets from the first routing domain to the second routing domain through the data center interconnect link with better QoS characteristics values than the QoS characteristics values for the first routing domain.

26. The system of claim 25 wherein the traffic comprise a plurality of Internet or other packets.

* * * * *